(12) United States Patent
Takahashi et al.

(10) Patent No.: US 10,849,183 B2
(45) Date of Patent: Nov. 24, 2020

(54) RADIO COMMUNICATION SYSTEM

(71) Applicant: NTT DOCOMO, INC., Tokyo (JP)

(72) Inventors: Hideaki Takahashi, Tokyo (JP); Tooru Uchino, Tokyo (JP); Wuri Andarmawanti Hapsari, Tokyo (JP); Anil Umesh, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/323,338

(22) PCT Filed: Aug. 4, 2017

(86) PCT No.: PCT/JP2017/028332
§ 371 (c)(1),
(2) Date: Feb. 5, 2019

(87) PCT Pub. No.: WO2018/030281
PCT Pub. Date: Feb. 15, 2018

(65) Prior Publication Data
US 2019/0208495 A1  Jul. 4, 2019

(30) Foreign Application Priority Data

Aug. 10, 2016 (JP) ................... 2016-158271
Aug. 10, 2016 (JP) ................... 2016-158272
Nov. 2, 2016 (JP) ................... 2016-215701

(51) Int. Cl.
*H04W 76/27* (2018.01)
*H04W 36/14* (2009.01)
(Continued)

(52) U.S. Cl.
CPC ....... *H04W 76/27* (2018.02); *H04W 36/0033* (2013.01); *H04W 36/08* (2013.01);
(Continued)

(58) Field of Classification Search
CPC ............ H04W 76/27; H04W 36/0005; H04W 36/0007; H04W 36/0011; H04W 36/0022;
(Continued)

(56) References Cited

U.S. PATENT DOCUMENTS

2012/0188980 A1  7/2012 Wang et al.
2016/0095034 A1  3/2016 Hampel
(Continued)

OTHER PUBLICATIONS

Office Action issued in counterpart U.S. Appl. No. 16/318,456, dated Jul. 29, 2019 (8 pages).
(Continued)

*Primary Examiner* — Ashley Shivers
(74) *Attorney, Agent, or Firm* — Osha Bergman Watanabe & Burton LLP

(57) ABSTRACT

Provided is a radio communication system capable of implementing a state transition related to an intermediate transition between a connected state and an idle state.
An aspect of the present invention relates to a radio communication system, including: a user equipment, wherein the user equipment includes a state management unit that manages a communication state of the user equipment, and a state transition unit that causes the communication state of the user equipment to transition, and when a sustenance message for causing the user equipment to transition from a connected state to a sustained state is received from a first base station, the state transition unit causes the user equipment to transition from the connected state to the sustained state, and the state management unit extracts a context identifier specifying radio parameter information for radio communication between the user equipment and the first base station and a base station-based location registration area configured with one or more cells including a cell of the first base station from the sustenance message and retains
(Continued)

the radio parameter information, the context identifier, and the base station-based location registration area.

4 Claims, 16 Drawing Sheets

(51) Int. Cl.
  *H04W 36/08*    (2009.01)
  *H04W 48/18*    (2009.01)
  *H04W 36/00*    (2009.01)
  *H04W 60/00*    (2009.01)
  *H04W 64/00*    (2009.01)

(52) U.S. Cl.
  CPC ........... *H04W 36/14* (2013.01); *H04W 48/18* (2013.01); *H04W 60/00* (2013.01); *H04W 64/003* (2013.01)

(58) Field of Classification Search
  CPC . H04W 36/0033; H04W 36/03; H04W 36/02; H04W 36/023; H04W 36/06; H04W 36/08
  See application file for complete search history.

(56) References Cited

U.S. PATENT DOCUMENTS

| | | | |
|---|---|---|---|
| 2017/0311276 A1 | 10/2017 | Tsai et al. | |
| 2017/0318606 A1* | 11/2017 | Lee | H04L 67/12 |
| 2019/0021134 A1* | 1/2019 | Zhang | H04W 36/0033 |
| 2019/0037420 A1* | 1/2019 | Fujishiro | H04W 76/27 |

OTHER PUBLICATIONS

International Search Report issued in PCT/JP2017/028332 dated Oct. 24, 2017 (3 pages).
Written Opinion of the International Searching Authority issued in PCT/JP2017/028332 dated Oct. 24, 2017 (3 pages).
3GPP TS 36.331 V13.2.0; 3rd Generation Partnership Project; Technical Specification Group Radio Access Network; Evolved Universal Terrestrial Radio Access (E-UTRA); Radio Resource Control (RRC); Protocol specification (Release 13); Jun. 2016 (622 pages).
3GPP TS 36.300 V13.6.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13); Dec. 2016 (314 pages).
3GPP TS 36.331 V13.4.0; "3rd Generation Partnership Project; Technical Specification Group Radio Access Network; Evolved Universal Terrestrial Radio Access (E-UTRA); Radio Resource Control (RRC); Protocol specification (Release 13)"; Dec. 2016 (629 pages).
Office Action issued in related U.S. Appl. No. 16/318,456, dated Apr. 4, 2019 (11 pages).
Extended European Search Report issued in the counterpart European Application No. 17839352.6, dated Feb. 27, 2020 (10 pages).
NTT Docomo, Inc.; "UE state transition diagram for NR"; 3GPP TSG-RAN WG2 #95bis, R2-167136; Kaohsiung, Taiwan, Oct. 10-14, 2016 (8 pages).
Ericsson,et al.; "Updates to solution 6.3.2"; SA WG2 Meeting #115, S2-163121; Nanjing, China, May 23-27, 2016 (3 pages).
CMCC; "Consideration of UE states"; 3GPP TSG-RAN WG2 Meeting #94, R2-163449; Nanjing, China, May 23-27, 2016 (4 pages).

* cited by examiner

FIG.1
10
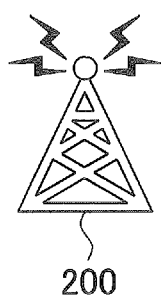
200
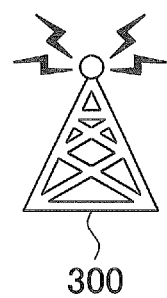
300
100

FIG.4

| From | To | procedure |
|---|---|---|
| NR RRC_IDLE | NR RRC_CONNECTED | RRC connection establishment |
| NR RRC_CONNECTED | NR RRC_IDLE | RRC connection release |
| NR RRC_SUSTAINED | NR RRC_CONNECTED | RRC connection resume |
| NR RRC_CONNECTED | NR RRC_SUSTAINED | RRC connection sustenance |
| NR RRC_SUSTAINED | NR RRC_IDLE | PROCEDURE IN WHICH eNB CAUSES UE IN RRC_SUSTAINED STATE TO TRANSITION TO RRC_IDLE IS SPECIFIED IN ADDITION TO CASE IN WHICH RESUME FAILS |
| NR RRC_CONNECTED | LTE RRC_CONNECTED | Inter-RAT Handover |
| LTE RRC_CONNECTED | NR RRC_CONNECTED | Inter-RAT Handover |
| NR RRC_IDLE | LTE RRC_IDLE | Inter-RAT cell reselection |
| LTE RRC_IDLE | NR RRC_IDLE | Inter-RAT cell reselection |
| NR RRC_SUSTAINED | LTE RRC_IDLE | Inter-RAT cell reselection |
| LTE RRC_IDLE | NR RRC_SUSTAINED | Inter-RAT cell reselection (ONLY SECOND EMBODIMENT) |

RADIO COMMUNICATION SYSTEM

TECHNICAL FIELD

The present invention relates to a radio communication system.

BACKGROUND ART

Currently, next generation standards (5G or a new radio access technology (NR)) of a long term evolution (LTE) system and an LTE-advanced system are under review in third generation partnership project (3GPP). As one of discussions in 3GPP, communication states of user equipments (UE) are under review. In the LTE system and the LTE-advanced system, it is specified that user equipments operate in two communication states, that is, a connected state by RRC_Connected and an idle state by RRC_Idle in radio resource control (RRC) that control radio networks.

CITATION LIST

Non-Patent Document

Non-Patent Document 1: 3GPP TS 36.331 V 13.2.0 (2016 June)

SUMMARY OF THE INVENTION

Problem to be Solved by the Invention

On the other hand, in an NR system, the introduction of an intermediate transition between the RRC_Connected state and the RRC_Idle state is under review. In the intermediate transition, the connected state between a user equipment and a base station (an NR node) is suspended, and it is unable to perform the allocation of individual resources, whereas the connected state of the user equipment is retained between a core network and the base station. For this reason, the intermediate transition is hereinafter referred to as a "sustained state." In the sustained state, radio parameters (an access stratum (AS) context) set in the RRC_Connected state are stored in the user equipment and the base station, the core network can detect a position of the user equipment in an area, and the base station can transmit paging to the user equipment in the sustained state. Upon receiving the paging, the user equipment transitions from the sustained state to the connected state and receives downlink data.

However, a specific process for state transition between the sustained state and the connected state or the idle state has not been discussed. Further, a situation in which the LTE system and the NR system coexist is anticipated, and there is a possibility that the user equipment transitions from the sustained state in the NR system to the LTE system through inter-RAT transition or transitions from the LTE system to the sustained state in the NR system. A specific process for transition to the sustained state or transition from the sustained state which is accompanied by the inter-RAT transition has neither been discussed.

The present invention was made in light of the above problems, it is an object of the present invention to provide a radio communication system capable of implementing the state transition related to the intermediate transition between the connected state and the idle state.

Means for Solving Problem

In order to solve the above problem, an aspect of the present invention relates to a radio communication system, including: a first base station that conforms to a first radio access technology; a second base station that conforms to a second radio access technology; and a user equipment, wherein the user equipment includes a state management unit that manages a communication state of the user equipment, and a state transition unit that causes the communication state of the user equipment to transition, and when a sustenance message for causing the user equipment to transition from a connected state to a sustained state is received from the first base station, the state transition unit causes the user equipment to transition from the connected state to the sustained state, and the state management unit extracts a context identifier specifying radio parameter information for radio communication between the user equipment and the first base station and a base station-based location registration area configured with one or more cells including a cell of the first base station from the sustenance message and retains the radio parameter information, the context identifier, and the base station-based location registration area.

Effect of the Invention

According to the present invention, it is possible to implement the state transition related to the intermediate transition between the connected state and the idle state.

BRIEF DESCRIPTION OF DRAWINGS

FIG. 1 is a schematic diagram illustrating a radio communication system according to one embodiment of the present invention;

FIG. 4 is a diagram illustrating a procedure list for inter-state transition according to one embodiment of the present invention;

MODE(S) FOR CARRYING OUT THE INVENTION

Figure 2:
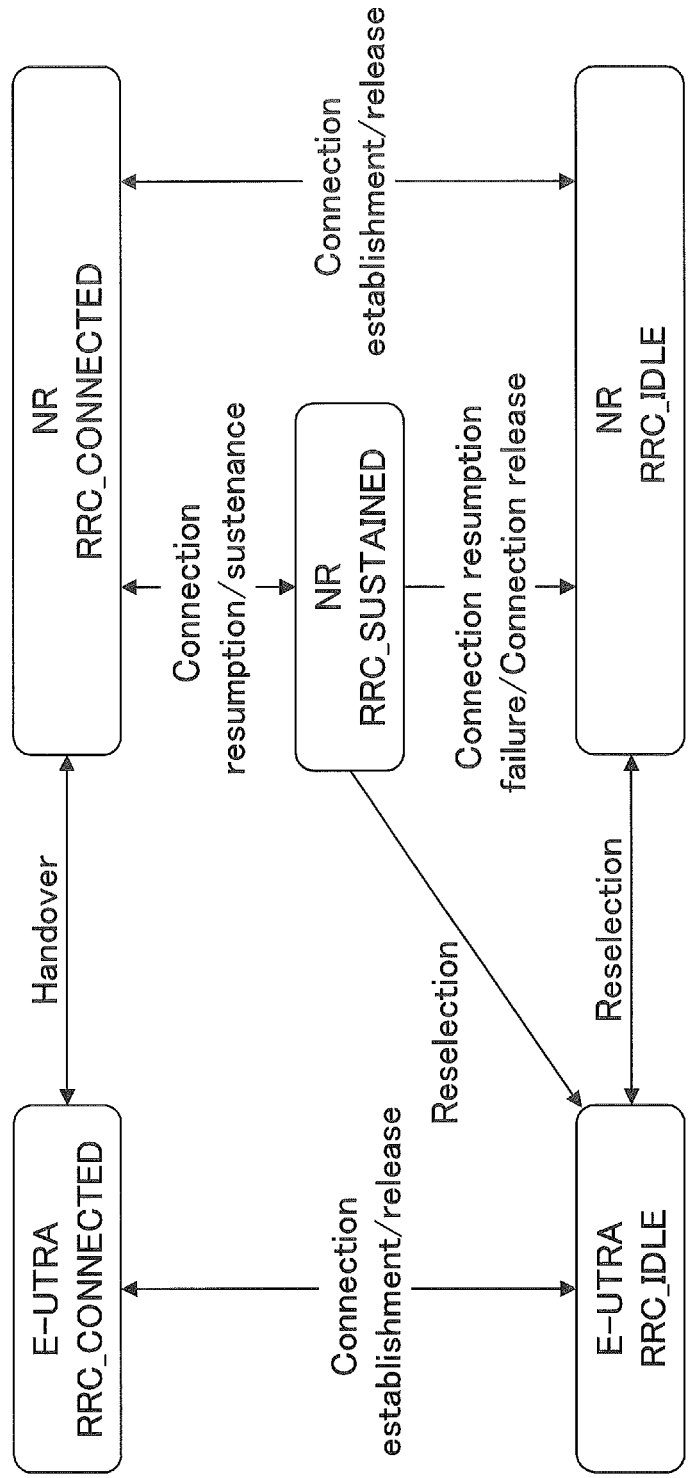
FIG. 2 is an RRC state transition diagram according to a first embodiment of the present invention.

Hereinafter, exemplary embodiments of the present invention will be described on the basis of the appended drawings.

In the following embodiments, disclosed is a radio communication system in which a user equipment capable of operating in an intermediate transition between a connected state and an idle state is able to perform transition of a communication state in a base station of the same RAT and to perform cell reselection for a base station of a different RAT.

First, a radio communication system according to one embodiment of the present invention will be described with reference to FIG. 1. FIG. 1 is a schematic diagram illustrating a radio communication system according to one embodiment of the present invention.

As illustrated in FIG. 1, a radio communication system 10 includes a user equipment (UE) 100 and a base stations 200 and 300. In the radio communication system 10, for example, a radio communication system conforming to the 3GPP Rel-14 standard or later (for example, an NR system or a 5G system) and an LTE system or the LTE-Advanced system conforming to Rel-13 coexist, and for example, the base station 200 may be a base station conforming to the NR system (an NR node), and the base station 300 may be a base station conforming to the LTE system (an evolved Node B (eNB)). In the following embodiments, it is assumed that the base station 200 is assumed to be an NR node, and the base station 300 is assumed to be an eNB. However, the present invention is not limited thereto and may be applied to a radio communication system conforming to the 3GPP standard or any other radio access technology conforming to a non-3GPP standard. Further, in the illustrated embodiment, only two base stations 200 and 300 are illustrated, but a number of base stations 200 and 300 are typically arranged to cover a coverage range of the radio communication system 10.

The user equipment 100 is any appropriate information processing device having a radio communication function such as a smartphone, a mobile phone, a tablet, or a wearable terminal and is able to communicate with both the NR system and the LTE system. In the following embodiment, the user equipment 100 operates in three communication states, that is, the connected state (NR RRC_CONNECTED), the sustained state (NR RRC_SUSTAINED), and the idle state (NR RRC_IDLE) in radio communication with the base station 200 and operates in two communication states, that is, the connected state (LTE RRC_CONNECTED) and the idle state (LTE RRC_IDLE) in radio communication with the base station 300. The sustained state of the NR system may be referred to as "NR RRC_INACTIVE."

The connected state (NR RRC_CONNECTED) in the NR system corresponds to the RRC_CONNECTED state in the LTE system, and the base station 200 controls the mobility of the user equipment 100 and allocates individual radio resources to the user equipment 100.

The idle state (NR RRC_IDLE) in the NR system corresponds to the RRC_IDLE state in the LTE system, and the user equipment 100 controls its own mobility, and core network (CN)-based paging is performed. In the idle state, individual radio resources are not allocated, and the AS context indicating the radio parameters set between the user equipment 100 and the base station 200 in the connected state are dropped in the user equipment 100 and the base station 200.

The sustained state (NR RRC_SUSTAINED) in the NR system corresponds to the intermediate transition between the RRC_CONNECTED state and the RRC_IDLE state in the LTE system. In other words, in the NR RRC_SUSTAINED state, the user equipment 100 controls its mobility and is able to perform, for example, cell reselection autonomously. Further, while the individual radio resources are not allocated to the user equipment 100, a connection related to the user equipment 100 is maintained between the core network and the base station 200, and radio access network (RAN)-based paging or base station or base station-based paging is performed. In other words, downlink data is transmitted from the core network to the base station 200 (a network monitor mode (NMM) registered ready state), and paging is performed for a base station-based location registration area as will be described later. The AS context indicating the radio parameters for the radio communication between the user equipment 100 and the base station 200 is retained in the user equipment 100 and the base station 200. Therefore, when the user equipment 100 returns to the connected state, the user equipment 100 can rapidly resume the radio communication with the base station 200 in accordance with the radio parameters. The intermediate transition between the connected state and the idle state is not limited to the above-described sustained state and may be another state having both a feature of the connected state and a feature of the idle state.

Each of the base stations 200 and 300 provides one or more cells and performs radio communication with the user equipment 100 via a cell under the management of the core network. In the present embodiment, the base station 200 conforms to the NR system, and the user equipment 100 is able to communicate with the base station 200 in the three communication states, that is, the connected state (NR RRC_CONNECTED), the sustained state (NR RRC_SUSTAINED), and the idle state (NR RRC_IDLE). On the other hand, the base station 300 conforms to the LTE system, and the user equipment 100 is able to communicate with the base station 300 in the two communication states, that is, the connected state (LTE or E-UTRA RRC_CONNECTED) and the idle state (LTE or E-UTRA RRC_IDLE).

Figure 3:
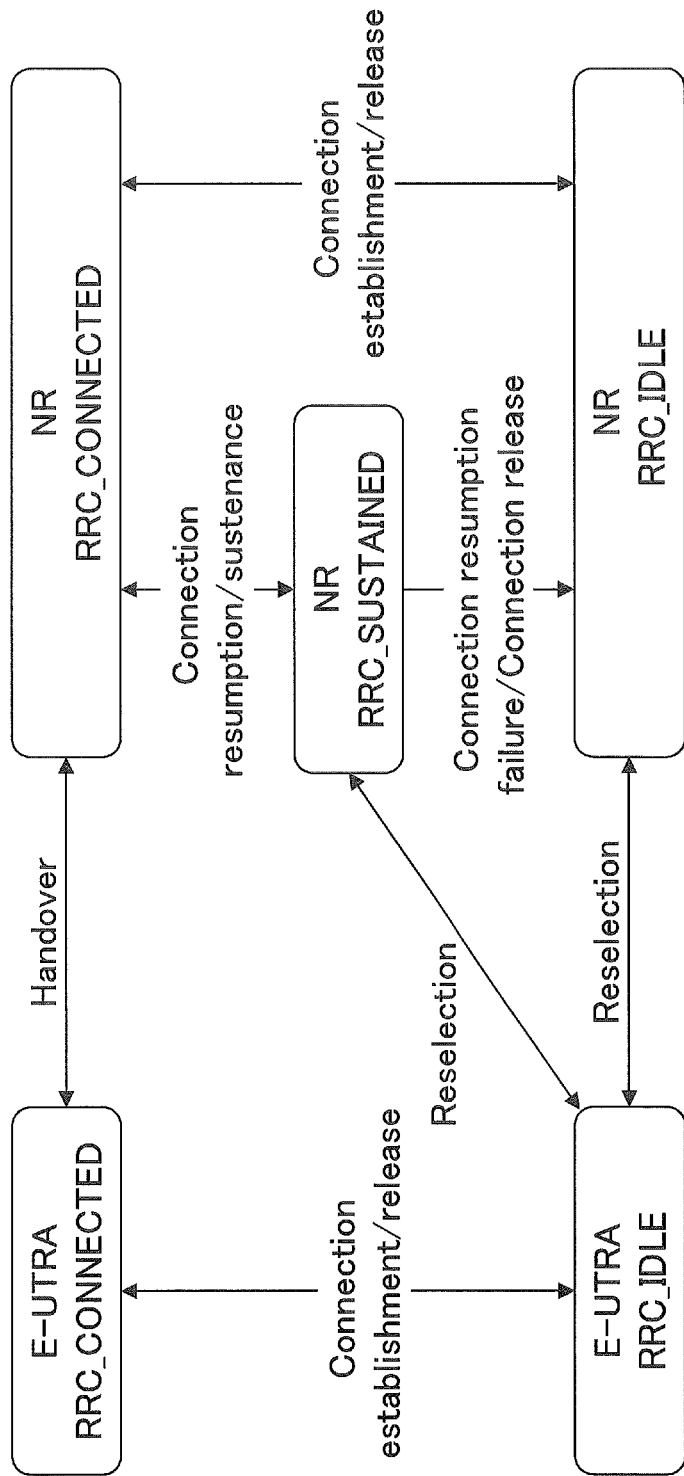
FIG. 3 is an RRC state transition diagram according to a second embodiment of the present invention.

FIG. 2 is an RRC state transition diagram according to a first embodiment of the present invention, and FIG. 3 is an RRC state transition diagram according to a second embodiment of the present invention. As can be understood from FIGS. 2 and 3, the first embodiment and the second embodiment differ only in transition between the NR RRC_SUSTAINED state and the E-UTRA RRC_IDLE (LTE RRC_IDLE) state. In other words, in the first embodiment, the user equipment 100 is able to transition from the NR RRC_SUSTAINED state to the E-UTRA RRC_IDLE state but is unable to transition from the E-UTRA RRC_IDLE state to the NR RRC_SUSTAINED state, and transition between the NR RRC_SUSTAINED state and the E-UTRA RRC_IDLE (LTE RRC_IDLE) state can be performed only in one direction. On the other hand, in the second embodiment, the user equipment 100 is able to transition from the NR RRC_SUSTAINED state to the E-UTRA RRC_IDLE state and transition from the E-UTRA RRC_IDLE state to the NR RRC_SUSTAINED state, and transition between the NR RRC_SUSTAINED state and the E-UTRA RRC_IDLE LTE RRC_IDLE) state can be performed in both directions. This is because the user equipment 100 according to the first embodiment drops the AS context for the radio communication with the base station 200 of the transition source after the transition from the NR RRC_SUSTAINED state to the E-UTRA RRC_IDLE state, while the user equipment 100 according to the second embodiment retains the AS context for the radio communication with the base station 200 of the transition source after the transition from the NR RRC_SUSTAINED state to the E-UTRA RRC_IDLE state.

Specific procedures used for the transition between the communication states are illustrated in FIGS. 2 and 3, and such procedures are listed in FIG. 4. In the following embodiment, a transition process related to the NR RRC_SUSTAINED state, that is, a transition process of NR RRC_CONNECTED→NR RRC_SUSTAINED, a transition process of NR RRC_SUSTAINED→NR RRC_IDLE, a transition process of NR RRC_SUSTAINED→LTE RRC_IDLE, and a transition process of LTE RRC_IDLE→NR RRC_SUSTAINED will be described. Of these, the transition process of NR RRC_CONNECTED→NR RRC_SUSTAINED and the transition process of NR RRC_SUSTAINED→NR RRC_IDLE are implemented in the NR system. On the other hand, the transition process of NR RRC_SUSTAINED→LTE RRC_IDLE and the transition process of LTE RRC_IDLE→NR RRC_SUSTAINED are implemented as the inter-RAT cell reselection between the NR system and the LTE system.

The transition process of NR RRC_SUSTAINED→NR RRC_CONNECTED can be considered to be implemented by applying the RRC connection resume in the LTE system, and a specific transition process thereof will be omitted below.

Figure 5:
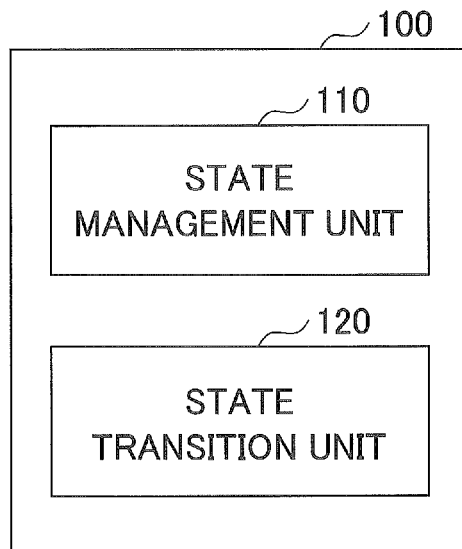
FIG. 5 is a block diagram illustrating a functional configuration of a user equipment according to one embodiment of the present invention.

Next, the user equipment according to one embodiment of the present invention will be described with reference to FIG. 5. FIG. 5 is a block diagram illustrating a functional configuration of the user equipment according to one embodiment of the present invention.

As illustrated in FIG. 5, the user equipment 100 includes a state management unit 110 and a state transition unit 120.

The state management unit 110 manages the communication state of the user equipment 100.

Specifically, in the radio communication with the base station 200 of the NR system, the state management unit 110 manages the communication state of the user equipment 100 in accordance with the three communication states of the connected state (NR RRC_CONNECTED), the sustained state (NR RRC_SUSTAINED), and the idle state (NR RRC_IDLE), and in the communication control with the base station 300 of the LTE system, the state management unit 110 manages the communication state of the user equipment 100 in accordance with the two communication states, that is, the connected state (LTE RRC_CONNECTED) and the idle state (LTE RRC_IDLE). The state management unit 110 retains or drops various kinds of information such as the AS context, the Resume ID identifying the AS context, the base station-based (intra-RAN) location registration area and data in accordance with the communication state of the user equipment 100.

The state transition unit 120 causes the communication state of the user equipment 100 to transition. Specifically, the state transition unit 120 causes the communication state of the user equipment 100 to transition by performing a corresponding transition procedure in accordance with the state transition diagram illustrated in FIG. 2 or FIG. 3. As described above, in the following embodiments, four types of transition processes, that is, NR RRC_CONNECTED→NR RRC_SUSTAINED, NR RRC_SUSTAINED→NR RRC_IDLE, NR RRC_SUSTAINED→LTE RRC_IDLE, and LTE RRC_IDLE→NR RRC_SUSTAINED will be described. Such transition procedures will be described later in detail with reference to FIGS. 7 to 14.

Figure 6:
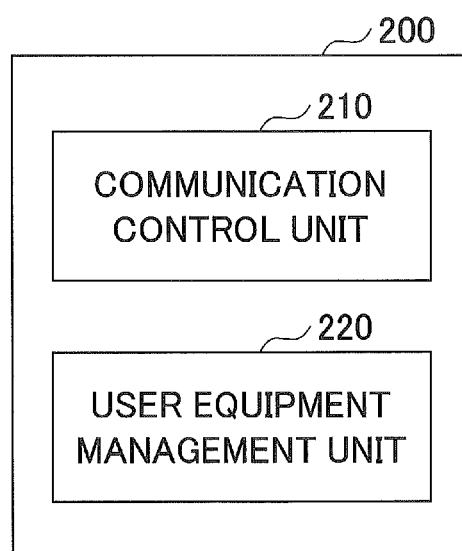
FIG. 6 is a block diagram illustrating a functional configuration of a base station according to one embodiment of the present invention.

Next, the base station according to one embodiment of the present invention will be described with reference to FIG. 6. The following description will proceed with the configuration of the base station 200, but the same description is practically applicable to the configuration of the base station 300. FIG. 6 is a block diagram illustrating a functional configuration of the base station according to one embodiment of the present invention.

As illustrated in FIG. 6, the base station 200 includes a communication control unit 210 and a user equipment management unit 220.

The communication control unit 210 controls the radio communication with the user equipment 100. Specifically, when the user equipment 100 establishes a radio connection with the base station 200, the communication control unit 210 sets the radio parameters for radio communication in the user equipment 100 and gives a notification of the radio parameters through the AS context. The communication control unit 210 transmits and receives a downlink/uplink control channel and/or a downlink/uplink data channel to/from the user equipment 100 by allocating individual radio resources to the user equipment 100 in the connected state.

Further, the communication control unit 210 communicates with other base stations 200 of the NR system and communicates with the core network (not illustrated) and/or the base station 300 of the LTE system. As described above, the connection between the base station 200 and the core network is maintained in the sustained state. Therefore, upon receiving the downlink data destined for the user equipment 100 from the core network, the communication control unit 210 transmits a paging channel via a cell of another base station in the base station-based location registration area together with the cell of the base station 200 as will be described later.

Further, the communication control unit 210 periodically broadcasts system information of the cell using a common channel. For example, the system information may include a core network-based location registration area (a paging area in the LTE system) indicating the base station to which the core network managing the base station 200 transmits the paging channel and a base station-based location registration area indicating the base station that transmits the paging channel to the user equipment 100 in the sustained state.

The user equipment management unit 220 manages the communication state of the user equipment 100. For example, when the user equipment 100 establishes a radio connection with the base station 200, the user equipment management unit 220 sets the communication state of the user equipment 100 to the connected state and retains the AS context set by the communication control unit 210 in the user equipment 100. As will be described later, the first example in which a transition in only one direction can be performed between the NR RRC_SUSTAINED state and the LTE RRC_IDLE state and the second embodiment in which transition in both directions can be performed between the NR RRC_SUSTAINED state and the LTE RRC_IDLE state differ in a drop timing of the AS context.

The user equipment management unit 220 retains or drops various kinds of information such as the AS context, the Resume ID identifying the AS context, the base station-based (intra-RAN) location registration area and data which will be described later in accordance with the communication state of the user equipment 100.

Figure 7:
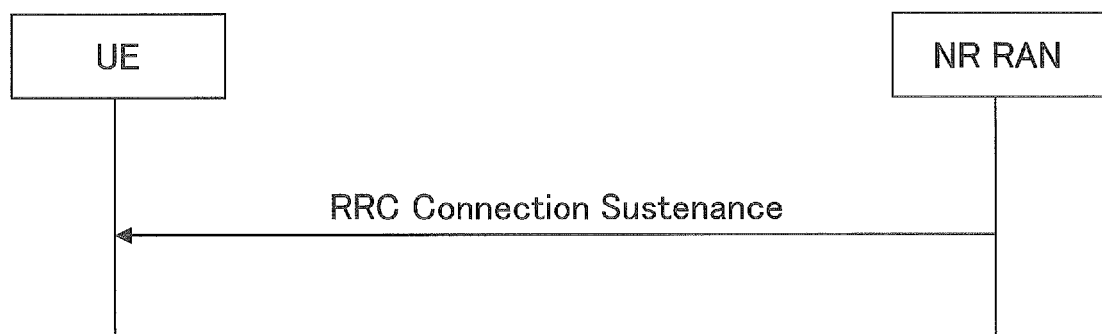
FIG. 7 is a diagram illustrating a state transition procedure of NR RRC_Connected→NR RRC_SUSTAINED according to one embodiment of the present invention.

Next, the transition process of NR RRC_CONNECTED→NR RRC_SUSTAINED according to one embodiment of the present invention will be described with reference to FIGS. 7 to 9. FIG. 7 is a diagram illustrating a state transition procedure of NR RRC_CONNECTED→NR RRC_SUSTAINED according to one embodiment of the present invention.

As illustrated in FIG. 7, the user equipment 100 receives a sustenance message (RRC Connection Sustenance) for transitioning from the connected state to the sustained state from the base station 200. Upon receiving the sustenance message, the state transition unit 120 causes the user equipment 100 to transition from the connected state to the sustained state, and the state management unit 110 extracts an context identifier identifying radio parameter information for the radio communication between the user equipment 100 and the base station 200 and the base station-based location registration area configured with one or more cells including the cell of the base station 200 from the sustenance message, and retains the radio parameter information, the context identifier, and the base station-based location registration area.

Specifically, the sustenance message includes a Resume ID that specifies an AS context indicating a wireless parameter set for the user equipment 100 when connecting to the base station 200, and a plurality of retransmissions that transmit a paging channel to the user equipment 100 in the sustained state and a base station-based location registration area indicating a cell. Upon receiving the sustenance message, the state transition unit 120 causes the user equipment 100 to transition from the NR RRC_CONNECTED state to the NR RRC_SUSTAINED state, and the state management unit 110 extracts the Resume ID and the base station-based location registration area from the received sustenance message and retains the extracted Resume ID and the base station-based location registration area together with the AS context set in the user equipment 100. On the other hand, when the sustenance message is transmitted, the user equipment management unit 220 retains the AS context and the Resume ID of the user equipment 100. Here, the Resume ID is an identifier uniquely identifying the AS context set in the user equipment 100 in the NR system. However, the context identifier according to the present embodiment is not limited thereto and may be any other appropriate identifier which is set in the user equipment 100 and identifies the radio parameter information retained in the state management unit 110. Further, the base station-based location registration area may typically be narrower than the core network-based location registration area indicating the base station to which the core network managing the base station 200 transmits the paging channel.

In one embodiment, the sustenance message may further include timer information indicating a validity period of the radio parameter information and the base station-based location registration area. Specifically, the state management unit 110 sets a timer which is specific or common to the retained AS context and/or the base station-based location registration area in accordance with the timer information, and measures a retention time of the AS context and/or the base station-based location registration area. When the timer expires, the state management unit 110 may drop the AS context and/or perform a procedure of updating the base station-based location registration area to be described below.

As described above, in the sustained state, the connection between the core network and the base station 200 is maintained with respect to the user equipment 100. Therefore, the downlink data destined for the user equipment 100 is transmitted from the core network to the base station 200. A terminating procedure for the user equipment 100 in the sustained state will be described with reference to FIGS. 8 and 9. In the illustrated embodiment, an example in which the user equipment 100 which has received the sustenance message from the base station 200 (an NR base station #1) and transitioned to the sustained state performs the cell reselection for another base station (an NR base station #2) in the NR system is illustrated.

Figure 8:
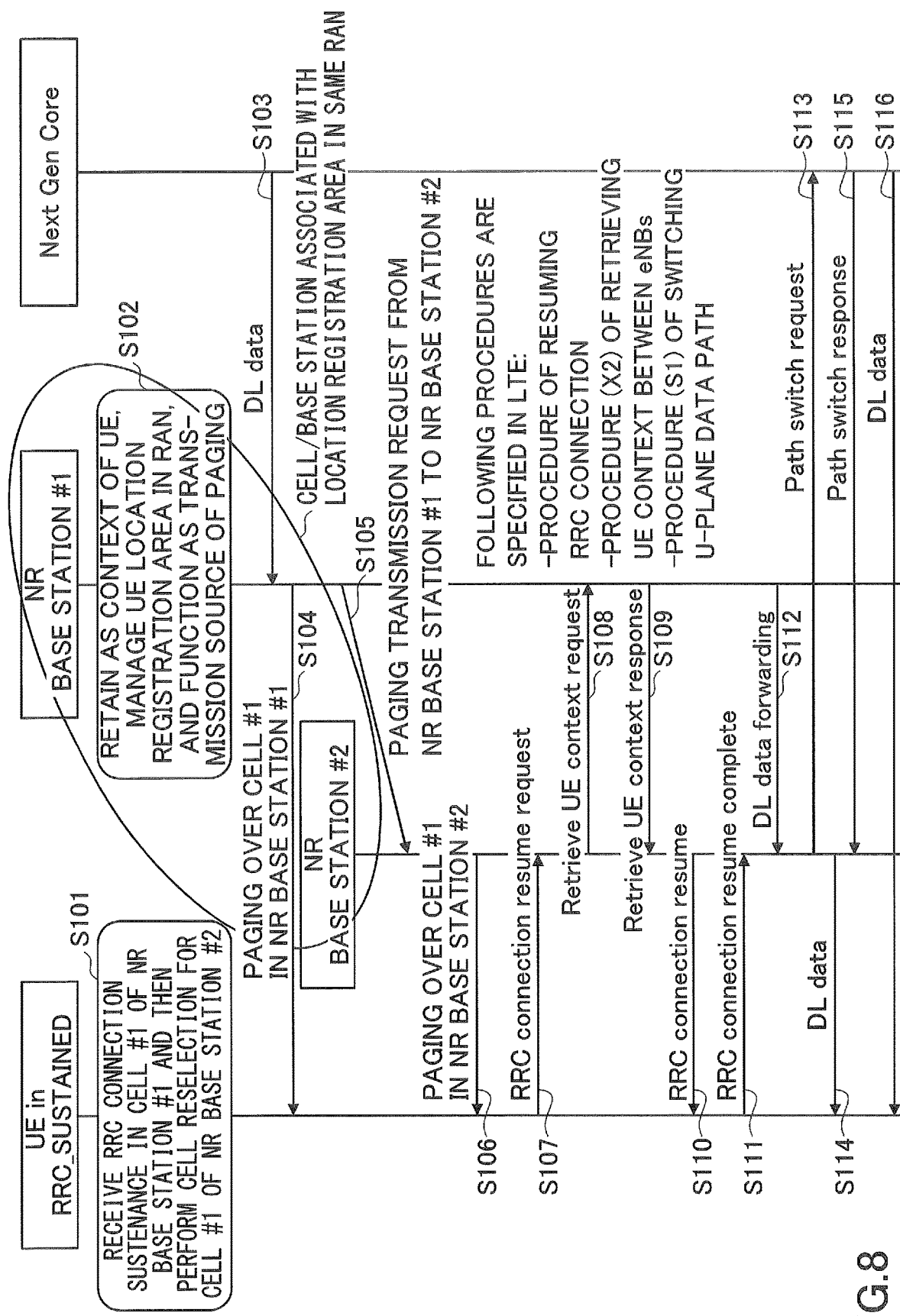
FIG. 8 is a sequence diagram illustrating a terminating process in an RRC_SUSTAINED state according to one embodiment of the present invention.

FIG. 8 is a sequence diagram illustrating a terminating process in the RRC_SUSTAINED state according to one embodiment of the present invention. In the embodiment illustrated in FIG. 8, the NR base station #1 and the NR base station #2 are assumed to be associated with the same base station-based (intra-RAN) location registration area.

As illustrated in FIG. 8, in step S101, the user equipment 100 receives the sustenance message (RRC Connection Sustenance) from the NR base station #1, transitions to the NR RRC_SUSTAINED state, and then performs the cell reselection for the NR base station #2.

In step S102, after transmitting the sustenance message, the NR base station #1 retains the AS context, the Resume ID, and the base station-based location registration area in the user equipment 100 and functions as a transmission source of the paging channel for the user equipment 100.

In step S103, the NR base station #1 receives the downlink data destined for the user equipment 100 from the core network.

In step S104, the NR base station #1 transmits the paging channel in its own cell in order to give a notification indicating that the downlink data destined for the user equipment 100 has been received, and in step S105, the NR base station #1 instructs all the base stations in the base station-based location registration area to transmit the paging channel for giving the notification indicating that the downlink data destined for the user equipment 100 has been received. Since the user equipment 100 resides in the NR base station #2 in the base station-based location registration area at the transmission timing of the paging channel, in step S106, the user equipment 100 receives the paging channel from the NR base station #2.

In step S107, in order to establish the communication connection with the NR base station #2 to receive the downlink data transmitted from the core network, the user equipment 100 in the idle state transmits an RRC connection resume including the retained Resume ID to the NR base station #2. In other words, since the communication connection can be established by employing the AS context retained in the user equipment 100 and the NR base station #1 in the sustained state, the communication connection can be established through the RRC connection resume instead of the RRC connection establishment. An order of steps in a subsequent communication resume process is merely an example and not limited to the following order.

In step S108, the NR base station #2 transmits a Retrieve UE context request including the Resume ID to the NR base station #1 in order to acquire the AS context of the user equipment 100, and in step S109, the NR base station #2 receives the requested AS context through a Retrieve UE context response.

In step S110, the NR base station #2 transmits the RRC connection resume to the user equipment 100 in order to resume the radio connection with the user equipment 100 based on the acquired AS context, and in step S111, the NR base station #2 receives a RRC connection resume complete indicating completion of the resumption of the radio connection. As described above, upon receiving the context identifier for the user equipment 100 in the sustained state from the NR base station #2, the user equipment management unit 220 of the NR base station #1 provides the radio parameter information corresponding to the context identifier to the NR base station #2.

In step S112, the NR base station #2 receives the downlink data destined for the user equipment 100 from the NR base station #1.

In step S113, the NR base station #2 transmits a Path switch request to the core network to change a transfer destination of the downlink data destined for the user equipment 100 from the NR base station #1 to the NR base station #2.

In step S114, the NR base station #2 transmits the downlink data transferred from the NR base station #1 to the user equipment 100.

In step S115, the NR base station #2 receives a Path switch response indicating that the transfer destination of the downlink data destined for the user equipment 100 has been changed.

In step S116, the NR base station #2 transmits the downlink data destined for the user equipment 100 transferred from the core network to the user equipment 100.

Figure 9:
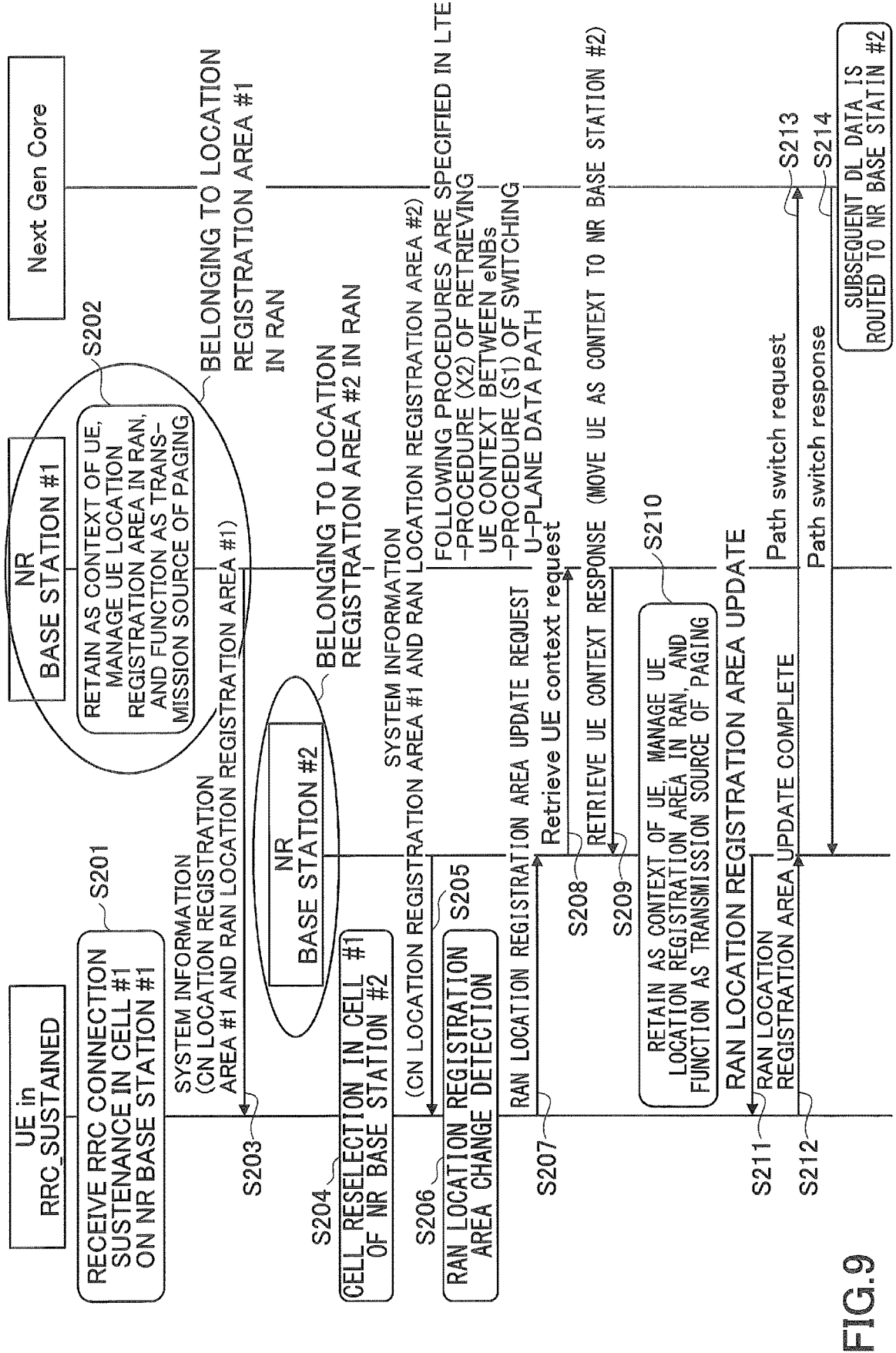
FIG. 9 is a sequence diagram illustrating a terminating process in an RRC_SUSTAINED state according to one embodiment of the present invention.

FIG. 9 is a sequence diagram illustrating a terminating process in the RRC_SUSTAINED state according to one embodiment of the present invention. In the embodiment illustrated in FIG. 9, the NR base station #1 and the NR base station #2 are assumed to be associated with different base station-based (intra-RAN) location registration areas.

As illustrated in FIG. 9, in step S201, the user equipment 100 receives the sustenance message (RRC Connection Sustenance) from the NR base station #1 and transitions to the NR RRC_SUSTAINED state.

In step S202, after transmitting the sustenance message, the NR base station #1 retains the AS context, the Resume ID, and the base station-based location registration area for the user equipment 100 and functions as the transmission source of the paging channel for the user equipment 100.

In step S203, the user equipment 100 receives the system information broadcast in a serving cell of the NR base station #1. Specifically, the system information includes the core network-based location registration area (the tracking area in the LTE system) and the base station-based location registration area indicating the base station that transmits the paging channel to the user equipment 100 in the sustained state.

In step S204, the user equipment 100 performs the cell reselection for the NR base station #2.

In step S205, the user equipment 100 receives the system information broadcast in a serving cell of the NR base station #2. Specifically, the system information includes the core network-based location registration area (tracking area in LTE system) and the base station-based location registration area indicating the base station transmitting the paging channel to the user equipment 100 in the sustained state. In the illustrated embodiment, the NR base station #1 and the NR base station #2 are associated with different base station-based location registration areas.

In step S206, the user equipment 100 detects that the base station-based location registration area received in step S203 is different from the base station-based location registration area received in step S206, and determines that the base station-based location registration area has been changed. In this case, although the NR base station #1 receives the downlink data destined for the user equipment 100 from the core network, the NR base station #1 is unable to give a notification of the reception of the downlink data to the user equipment 100 through the paging channel. For this reason, in the following step, it is necessary to perform a process of changing the base station-based location registration area. In other words, when the base station-based location registration area obtained from the NR base station #1 before the cell transition is different from the base station-based location registration area acquired from the NR base station #2 after the cell transition, the state management unit 110 requests the NR base station #2 to change the transfer destination of the downlink data which is destined for the user equipment 100 from the core network.

In step S207, the user equipment 100 transmits an update request including the retained Resume ID to the NR base station #2 in order to update the base station-based location registration area of the user equipment 100 with the base station-based location registration area of the NR base station #2.

In step S208, the NR base station #2 transmits a Retrieve UE context request including the Resume ID to the NR base station #1 in order to acquire the AS context of the user equipment 100, and in step S209, the NR base station #2 receives the requested AS context through the Retrieve UE context response.

In step S210, the NR base station #2 retains the AS context, the Resume ID, and the base station-based location registration area for the user equipment 100 and functions as a transmission source of the paging channel for the user equipment 100.

In step S211, the NR base station #2 instructs the user equipment 100 to update the base station-based location registration area, and in step S212, the NR base station #2 receives a base station-based location registration area update complete notification.

In step S213, the NR base station #2 transmits the Path switch request to the core network to change the transfer destination of the downlink data destined for the user equipment 100 from the NR base station #1 to the NR base station #2, and in step S214, the NR base station #2 receives the Path switch response indicating that the transfer destination of the downlink data destined for the user equipment 100 has been changed. Thereafter, the downlink data destined for user equipment 100 is transferred from the core network to the NR base station #2.

Figure 10:
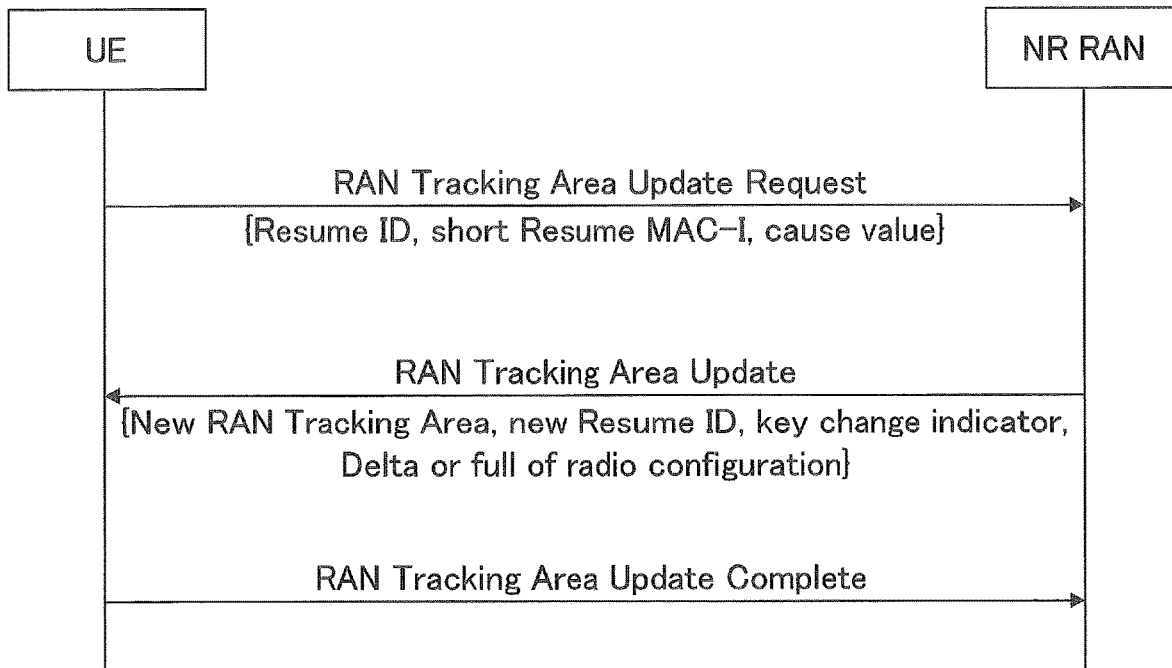
FIG. 10 is a sequence diagram illustrating a location registration area update procedure according to one embodiment of the present invention.

Next, a specific procedure of updating the base station-based location registration area will be described with reference to FIG. 10. For example, the update procedure is performed in response to the detection of the fact that the base station-based location registration area acquired and the base station-based location registration area acquired after the cell reselection are different as described above. FIG. 10 is a sequence diagram illustrating a location registration area update procedure according to one embodiment of the present invention.

As illustrated in FIG. 10, the user equipment 100 transmits a RAN Tracking Area Update Request to the NR base station (the NR base station #2 in the specific example described above) in order to request the update of the base station-based location registration area. For example, the RAN Tracking Area Update Request includes an identifier (a short Resume MAC-I or the like) for authenticating the AS context, a cause value indicating an execution cause of the location registration update, and the like in addition to a Resume ID identifying the AS context to be held.

Upon receiving the RAN Tracking Area Update Request, the NR base station transmits a RAN Tracking Area update to the user equipment 100. For example, the RAN Tracking Area update includes a new base station-based location registration area (a New RAN Tracking Area), a new Resume ID, a security key update indicator (a key change indicator) (if necessary), and a radio configuration (when updated), and the like. Since the base station storing the AS context for the user equipment 100 is changed, a notification of a new Resume ID is given to the user equipment 100. In order to update the security key, Refresh and/or Re-keying may be used, similarly to the LTE standard. Further, when the radio configuration (including a bearer) is updated, a notification of all updated radio configurations may be performed, or a notification of only a difference may be performed.

Thereafter, the user equipment 100 transmits the RAN Tracking Area Update Complete to the NR base station.

Figure 11:
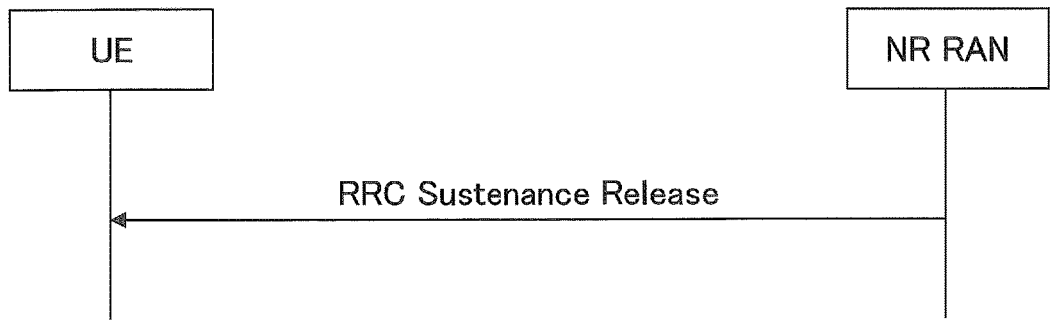
FIG. 11 is a diagram illustrating a state transition procedure of NR RRC_SUSTAINED→NR RRC_Idle according to one embodiment of the present invention.
Figure 12:
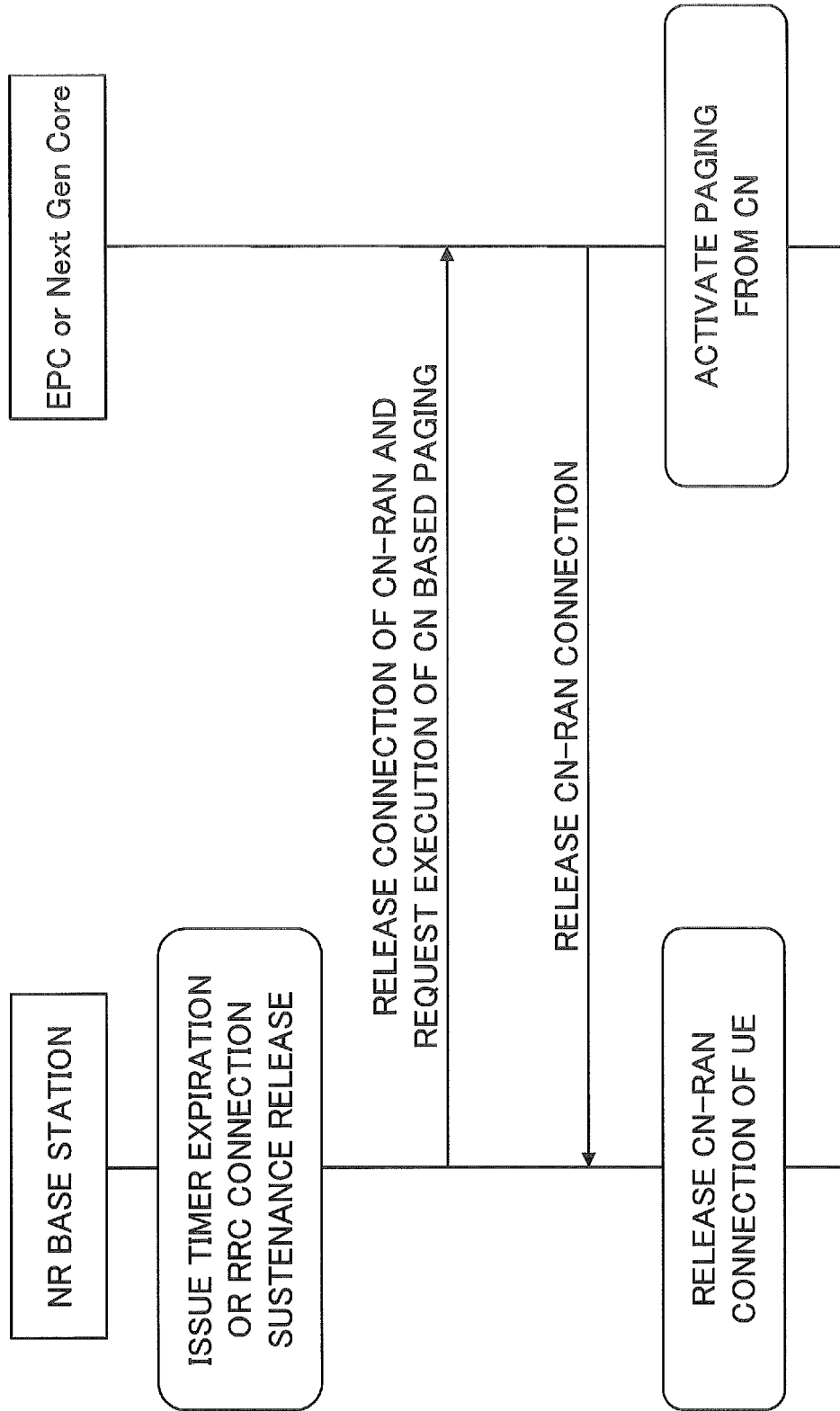
FIG. 12 is a diagram illustrating a release procedure of a CN-RAN connection at the time of transition of NR RRC_SUSTAINED→NR RRC_IDLE according to one embodiment of the present invention.

Next, the transition process of NR RRC_SUSTAINED→NR RRC_IDLE according to one embodiment of the present invention will be described with reference to FIGS. 11 to 12. FIG. 11 is a diagram illustrating a state transition procedure of NR RRC_SUSTAINED→NR RRC_IDLE according to one embodiment of the present invention. In the illustrated embodiment, the user equipment 100 transitions from the sustained state to the idle state in accordance with signaling from the base station 200.

As illustrated in FIG. 11, the user equipment 100 receives a release message (RRC Sustenance Release) for performing transition from the sustained state to the idle state from the base station 200. Upon receiving the release message, the state transition unit 120 determines whether or not the release message is destined for the user equipment 100 on the basis of the retained context identifier, and when the release message is determined to be destined for the user equipment 100, the state transition unit 120 causes the user equipment 100 to transition from the sustained state to the idle state. As illustrated in FIG. 11, the release message may be implemented by a new procedure such as a newly defined RRC Sustenance release or by employing a procedure in the LTE system such as the RRC connection release or the paging message.

As described above, in the sustained state, individual radio resources are not allocated to the user equipment 100, and the base station 200 transmits the release message to the user equipment 100 through a common channel (common control channel). Alternatively, a notification of the release message may be give through a logical channel or a message which can be received only by the user equipment 100 in the sustained state. For example, the notification of the release message may be given by a newly defined logical channel such as a sustained control channel (SCCH) or may be given by a SCCH (a logical channel)-DL-SCH (a transport channel)-PDSCH (a physical channel). Alternatively, a radio network temporary ID (RNTI) for the sustained state may be specified, and a cyclic redundancy check (CRC) of the message may be scrambled into the RNTI.

Further, the release message may include the Resume ID. In this case, when the user equipment 100 in the sustained state receives the release message, the state management unit 110 determines whether or not the received Resume ID is identical to the retained Resume ID, and when the received Resume ID is identical to the retained Resume ID, the state management unit 110 drops the corresponding retained AS context and the base station-based location registration area, and the state transition unit 120 causes the user equipment 100 to transition from the sustained state to the idle state.

In the above-described embodiment, the user equipment 100 transitions from the sustained state to the idle state in accordance with the signaling from the base station 200, but in other embodiments, a timer that measures the retention period of the radio parameter information, the context identifier, and the base station-based location registration area is used, and when the timer expires, the user equipment 100 may autonomously transition from the sustained state to the idle state. Specifically, the state management unit 110 sets an individual or common timer for the retained AS context, the Resume ID, and/or base station-based location registration area, and measures the retention time of the AS context, the Resume ID and/or the base station-based location registration area. When the timer expires, the state management unit 110 may drop the AS context, the Resume ID, and/or the base station-based location registration area, and the state transition unit 120 may cause the user equipment 100 to autonomously transition from the NR RRC_SUSTAINED state to the NR RRC_IDLE state. In this case, a notification of the individual or common timer may be given from the base station 200 to the user equipment 100 when the user equipment 100 transitions from the NR RRC_CONNECTED state to the NR RRC_SUSTAINED state. Alternatively, a notification of the individual or common timer may be given from the base station 200 through the sustenance message (RRC Connection Sustenance).

Thus, when the user equipment 100 transitions from the sustained state to the idle state in response to the release message from the base station 200 or transitions from the sustained state to the idle state autonomously using the timer, the connection between the base station 200 and the core network may be released. Specifically, the connection between the base station 200 and the core network may be released in accordance with the release procedure illustrated in FIG. 12.

In other words, when the timer set for the user equipment 100 expires or after the RRC Sustenance release is transmitted to the user equipment 100, the base station 200 releases the connection maintained between the core network and the base station 200, and when the downlink data destined for the user equipment 100 is received, the base station 200 requests the core network to transmit paging to the base station of the core network-based location registration area. The core network-based location registration area corresponds to the tracking area in the LTE system and indicates the base station to which the core network gives a notification of the paging. As a result, the base station 200 and the core network release the maintained connection. Thereafter, when the downlink data destined for the user equipment 100 is received, the core network gives the notification of the paging to the base station of the core network-based location registration area without transferring the downlink data to the base station 200.

Next, the transition process between NR RRC_SUSTAINED and LTE RRC_IDLE according to one embodiment of the present invention will be described with reference to FIGS. 13 to 14. As described above, the user equipment 100 in the sustained state can autonomously perform the cell reselection (the inter-RAT cell reselection) for the base station 300 of the LTE system in order to control the mobility.

As described above with reference to FIGS. 2 and 3, for the transition process between NR RRC_SUSTAINED and LTE RRC_IDLE, the first embodiment in which the AS context is dropped in the inter-RAT transition, and transition can be performed only in one direction from the NR RRC_SUSTAINED state to the LTE RRC_IDLE state and the second embodiment in which the AS context is retained in the RAT transition, and transition can be performed in both directions between the NR RRC_SUSTAINED state and the LTE RRC_IDLE state are assumed.

First, the transition process of NR RRC_SUSTAINED→LTE RRC_IDLE according to the first embodiment will be described. In the present embodiment, when user equipment 100 is communicating with base station 200 in the sustained state (NR RRC_SUSTAINED), if the cell reselection for the base station 300 is performed, the state transition unit 120 may cause the user equipment 100 to transition from the sustained state to the idle state (LTE RRC_IDLE) in the base station 300, and the state management unit 110 may drop the radio parameter information, the context identifier and the base station-based location registration area at a predetermined drop timing.

Specifically, when the user equipment 100 in the NR RRC_SUSTAINED state performs the cell reselection for the base station 300 of the LTE system and resides in the cell of the base station 300, the state transition unit 120 causes the user equipment 100 to transition from the NR RRC_SUSTAINED state to the LTE RRC_IDLE state. In the first embodiment, since the AS context is dropped in the inter-RAT transition, the state management unit 110 drops the retained AS context, the Resume ID, and the base station-based location registration area at a predetermined drop timing.

In one embodiment, the state management unit 110 may drop the retained AS context, the Resume ID, and/or the base station-based location registration area at an execution timing of the cell reselection for the base station 300.

In another embodiment, the state management unit 110 may set an individual or common timer for the retained AS context, the Resume ID, and/or the base station-based location registration area and measure the retention time of the AS context, the Resume ID, and/or the base station-based location registration area. When the timer expires (without depending on whether it resides in the base station 200 or the base station 300), the state management unit 110 may drop the AS context, the Resume ID and/or the base station-based location registration area.

In yet another embodiment, the state management unit 110 may drop the AS context, the Resume ID and/or the base station-based location registration area at a timing at which the communication connection with the base station 300 in which it resides after the cell reselection is about to be established or at a timing at which the establishment of the communication connection is completed. In other words, when the user equipment 100 performs the cell reselection for the base station 300 (LTE RRC_IDLE), the state management unit 110 may continue to retain the AS context, the Resume ID and/or the base station-based location registration area and drop the AS context, the Resume ID, and/or the base station-based location registration area after the connected state in the base station 300 (LTE RRC_CONNECTED).

Next, the transition process of NR RRC_SUSTAINED→LTE RRC_IDLE by the second embodiment will be described. In the present embodiment, when the user equipment 100 is communicating with the base station 200 in the sustained state, if the cell reselection for the base station 300 is performed, the state management unit 110 retains the radio parameter information for the radio communication between the user equipment 100 and the base station 200 and the context identifier identifying the radio parameter information, and the state transition unit 120 performs the cell reselection for the base station 300. Specifically, when the user equipment 100 is communicating with the base station 200 in the NR RRC_SUSTAINED state, if the cell reselection to the base station 300 is performed, the state management unit 120 does not drop the AS context, the Resume ID, and the base station-based location registration area, and the state transition unit 120 causes the user equipment 100 to transition from the NR RRC_SUSTAINED state to the LTE RRC_IDLE state in the base station 300.

Figure 13:
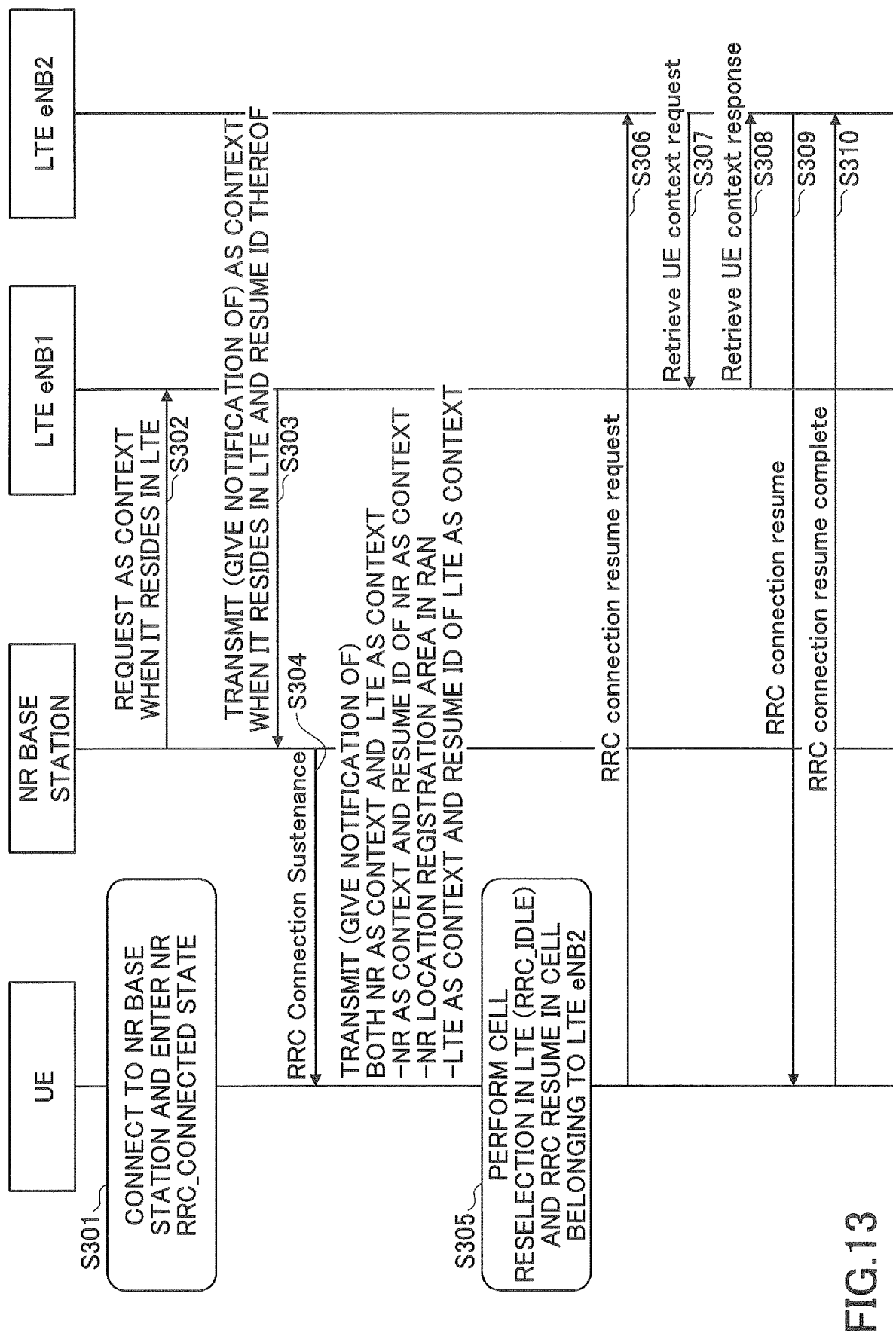
FIG. 13 is a diagram illustrating a state transition procedure of NR RRC_SUSTAINED→LTE RRC_Idle according to the second embodiment of the present invention.

FIG. 13 is a diagram illustrating the state transition procedure of NR RRC_SUSTAINED→LTE RRC_IDLE according to the second embodiment of the present invention.

As illustrated in FIG. 13, in step S301, the user equipment 100 is connected to the base station 200 (the NR base station), and the state management unit 110 manages the communication state of the user equipment 100 as NR RRC_CONNECTED.

In step S302, the NR base station requests the base station 300 (LTE eNB #1) of the LTE system to transmit the AS context to be applied when the user equipment 100 is connected to the LTE eNB #1.

In step S303, the NR base station acquires the AS context to be set in the user equipment 100 and the Resume ID identifying the AS context in the radio communication with the LTE eNB #1. In other words, when the user equipment 100 is connected to the NR base station, the NR base station acquires the radio parameter information and the context identifier for the radio communication between the user equipment 100 and the LTE eNB #1 from the LTE eNB #1.

In step S304, the NR base station transmits the sustenance message (RRC Connection Sustenance) for causing the user equipment 100 to transition from the NR RRC_CONNECTED state to the NR RRC_SUSTAINED state to the user equipment 100. The sustenance message may include the AS context and the Resume ID set in the user equipment 100 for the radio communication with the NR base station, the AS context and the Resume ID set in the user equipment 100 for the radio communication with the LTE eNB #1, and the base station-based location registration area. Upon receiving the sustenance message, the state transition unit 120 causes the user equipment 100 to transition from the NR RRC_CONNECTED state to the NR RRC_SUSTAINED state. Further, the state management unit 110 retains the AS context and the Resume ID set in the user equipment 100 for the radio communication with the NR base station, the AS context and the Resume ID set in the user equipment 100 for the radio communication with the LTE eNB #1, and the base station-based location registration area. In other words, upon receiving the sustenance message for causing the user equipment 100 to transition from the connected state to the sustained state from the NR base station, the state management unit 110 extracts the radio parameter information for radio communication between the user equipment 100 and the NR base station and the context identifier specifying the radio parameter information, the radio parameter information for radio communication between the user equipment 100 and the LTE eNB #1 and the context identifier specifying the radio parameter information, and the base station-based location registration area of the NR base station from the sustenance message, and retains the extracted information.

In step S305, the user equipment 100 decides to perform the cell reselection for the LTE eNB #2 and establish the radio connection with the LTE eNB #2, and performs subsequent steps for establishing the radio connection with the LTE eNB #2.

In step S306, the user equipment 100 transmits the RRC connection resume request including the retained Resume ID to the LTE eNB #2 in order to establish the radio connection.

In step S307, in order to acquire the AS context of the user equipment 100, the LTE eNB #2 transmits the Retrieve UE context request including the Resume ID to the LTE eNB #1, and in step S308, the LTE eNB #2 transmits the requested AS context as the Retrieve UE context response. the Resume ID is configured to indicate the LTE eNB #1 in which the corresponding AS context is stored. Therefore, the LTE eNB #2 can determine that the AS context corresponding to the received Resume ID is retained in the LTE eNB #1.

In step S309, the LTE eNB #2 transmits the RRC connection resume to the user equipment 100 in order to resume the radio connection with the user equipment 100 on the basis of the acquired AS context, and in step S310, the LTE eNB #2 receives RRC connection resume complete indicating the completion of the resumption of the radio connection. Accordingly, the radio connection between the user equipment 100 and the LTE eNB #2 is established.

Next, the transition process of LTE RRC_IDLE→NR RRC_SUSTAINED according to the second embodiment will be described. In the present embodiment, when the user equipment 100 is communicating with the base station 300 in the idle state, if the cell reselection for the base station 200 is performed, the state management unit 110 retains the radio parameter information for the radio communication between the user equipment 100 and the base station 300 and the context identifier specifying the radio parameter information, and the state transition unit 120 performs the cell reselection to the base station 200. Specifically, when the user equipment 100 resides in the base station 300 in the LTE RRC_IDLE state, if the cell reselection for the base station 200 is performed, the state management unit 120 does not drop the AS context, the Resume ID, and the base station-based location registration area, and the state transition unit 120 causes the user equipment 100 to transition from the LTE RRC_IDLE state to the NR RRC_SUSTAINED state in the base station 300.

Figure 14:
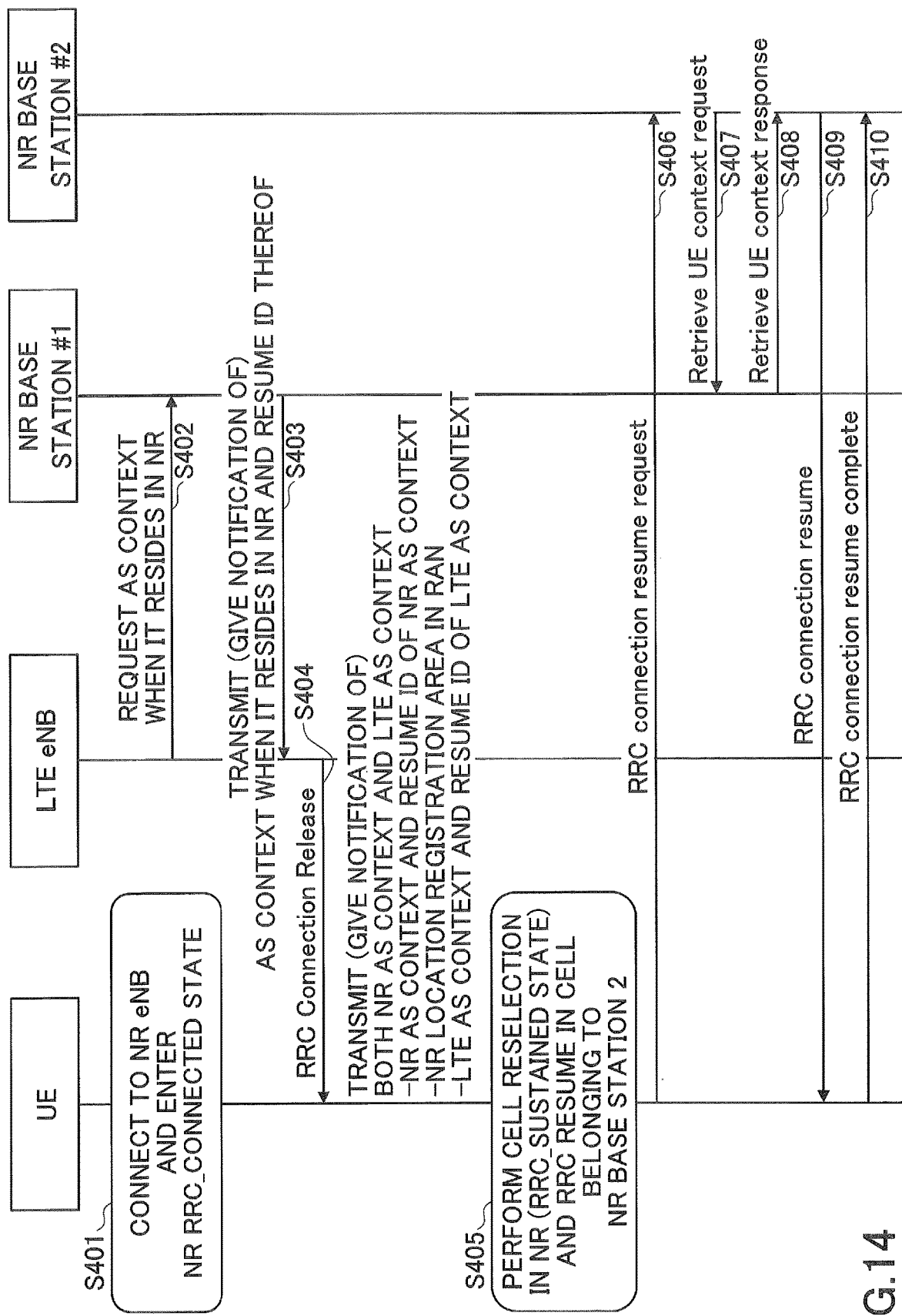
FIG. 14 is a diagram illustrating a state transition procedure of LTE RRC_SUSTAINED→NR RRC_Idle according to the second embodiment of the present invention.

FIG. 14 is a diagram illustrating the state transition procedure of LTE RRC_IDLE→NR RRC_SUSTAINED according to the second embodiment of the present invention.

As illustrated in FIG. 14, in step S401, the user equipment 100 is connected to the base station 300 (the LTE eNB), and the state management unit 110 manages the communication state of the user equipment 100 as LTE RRC_CONNECTED.

In step S402, the LTE eNB requests the base station 200 (the NR base station #1) of the NR system to transmit the AS context to be applied when the user equipment 100 is connected to the NR base station #1.

In step S403, the LTE eNB acquires the AS context set in the user equipment 100 and the Resume ID identifying the AS context in the radio communication with the NR base station #1. In other words, when the user equipment 100 is connected to the LTE eNB, the LTE eNB acquires the radio parameter information and the context identifier for the radio communication between the user equipment 100 and the NR base station #1 from the NR base station #1.

In step S404, the LTE eNB transmits the release message (RRC Connection Release) for causing the user equipment 100 to transition from the LTE RRC_CONNECTED state to the LTE RRC_IDLE state to the user equipment 100. The release message may include the AS context and the Resume ID to be set in the user equipment 100 for the radio communication with the LTE eNB, the AS context and the Resume ID to be set in the user equipment 100 for the radio communication with the NR base station #1, and the base station-based location registration area. Upon receiving the sustenance message, the state transition unit 120 causes the user equipment 100 to transition from the LTE RRC_CONNECTED state to the LTE RRC_IDLE state. Further, the state management unit 110 retains the AS context and the Resume ID set in the user equipment 100 for the radio communication with the LTE eNB, the AS context and the Resume ID set in the user equipment 100 for the radio communication with the NR base station #1, and the base station-based location registration area. In other words, upon receiving the release message for causing the user equipment 100 to transition from the connected state to the idle state from the LTE eNB, the state management unit 110 extracts the radio parameter information for the radio communication between the user equipment 100 and the LTE eNB and the context identifier for specifying the radio parameter information, the radio parameter information for the radio communication between the user equipment 100 and the NR base station #1 and the context identifier for specifying the radio parameter information, and the base station-based location registration area of the NR base station #1, and retains the extracted information.

In step S405, the user equipment 100 decides to perform the cell reselection for the NR base station #2 and establish the radio connection with the NR base station #2, and performs subsequent steps for establishing the radio connection with the NR base station #2.

In step S406, the user equipment 100 transmits the RRC connection resume request including the retained Resume ID to the NR base station #2 in order to establish the radio connection.

In step S407, the NR base station #2 transmits the Retrieve UE context request including the Resume ID to the NR base station #1 to acquire the AS context of the user equipment 100, and in step S408, the NR base station #2 transmits the requested AS context through the Retrieve UE context response. The Resume ID is configured to indicate the NR base station #1 in which the corresponding AS context is stored. Therefore, the NR base station #2 can determine that the AS context corresponding to the received Resume ID is retained in the NR base station #1.

In step S409, the NR base station #2 transmits the RRC connection resume to the user equipment 100 in order to resume the radio connection with the user equipment 100 on the basis of the acquired AS context, and in step S410, the NR base station #2 receives the RRC connection resume complete indicating the completion of the resumption of the radio connection. Accordingly, the radio connection between the user equipment 100 and the NR base station #2 is established.

As described above, according to the second embodiment, the user equipment 100 continuously retains the radio parameter information (the AS context) for the LTE system and the NR system and the context identifier (the Resume ID) specifying the AS context during the cell reselection. In one embodiment, the state management unit 110 may include a timer that measures the retention period of either or both of the radio parameter information and the context identifier in the base stations 200 and 300, and when the timer expires, the state management unit 110 may drop either or both of the retained radio parameter information and the context identifier. In another embodiment, the state management unit 110 may drop the AS context, the Resume ID, and/or the base station-based location registration area when the user equipment 100 performs the cell reselection for another RAT system other than the LTE system and NR system (universal mobile telecommunications system (UMTS), global system for mobile communications (GSM), or the like). In yet another embodiment, the state management unit 110 may continuously retain the AS context, the Resume ID, and/or the base station-based location registration area until the timer expires even after the cell reselection for another RAT system is performed. In yet another embodiment, the state management unit 110 may drop the AS context, the Resume ID, and/or the base station-based location registration area at a timing at which the communication connection with another RAT base station in which it resides is about to be established after the cell reselection for another RAT system or at a timing at which the establishment of the communication connection is completed. In other words, when the user equipment 100 performs the cell reselection for another RAT base station, the state management unit 110 may continue to retain the AS context, the Resume ID, and/or the base station-based location registration area and drop the AS context, the Resume ID, and/or the base station-based location registration area after connected state in another RAT base station.

Next, the base station-based location registration area and the core network-based location registration area according to one embodiment of the present invention will be described with reference to FIG. 15. As described above, the base station-based location registration area indicates the base station or the cell that transmits the paging channel to the user equipment 100 in the sustained state, and the core network-based location registration area indicates the base station or the cell to which the core network transmits the paging channel. In the present embodiment, the base station (RAN)-based location registration area and the core network (CN)-based location registration area may be the tracking area and the paging area in the LTE system, respectively. Thus, it is unnecessary to give a notification of a new area identifier or code for the base station-based location registration area and the core network-based location registration area in the NR system.

Figure 15:
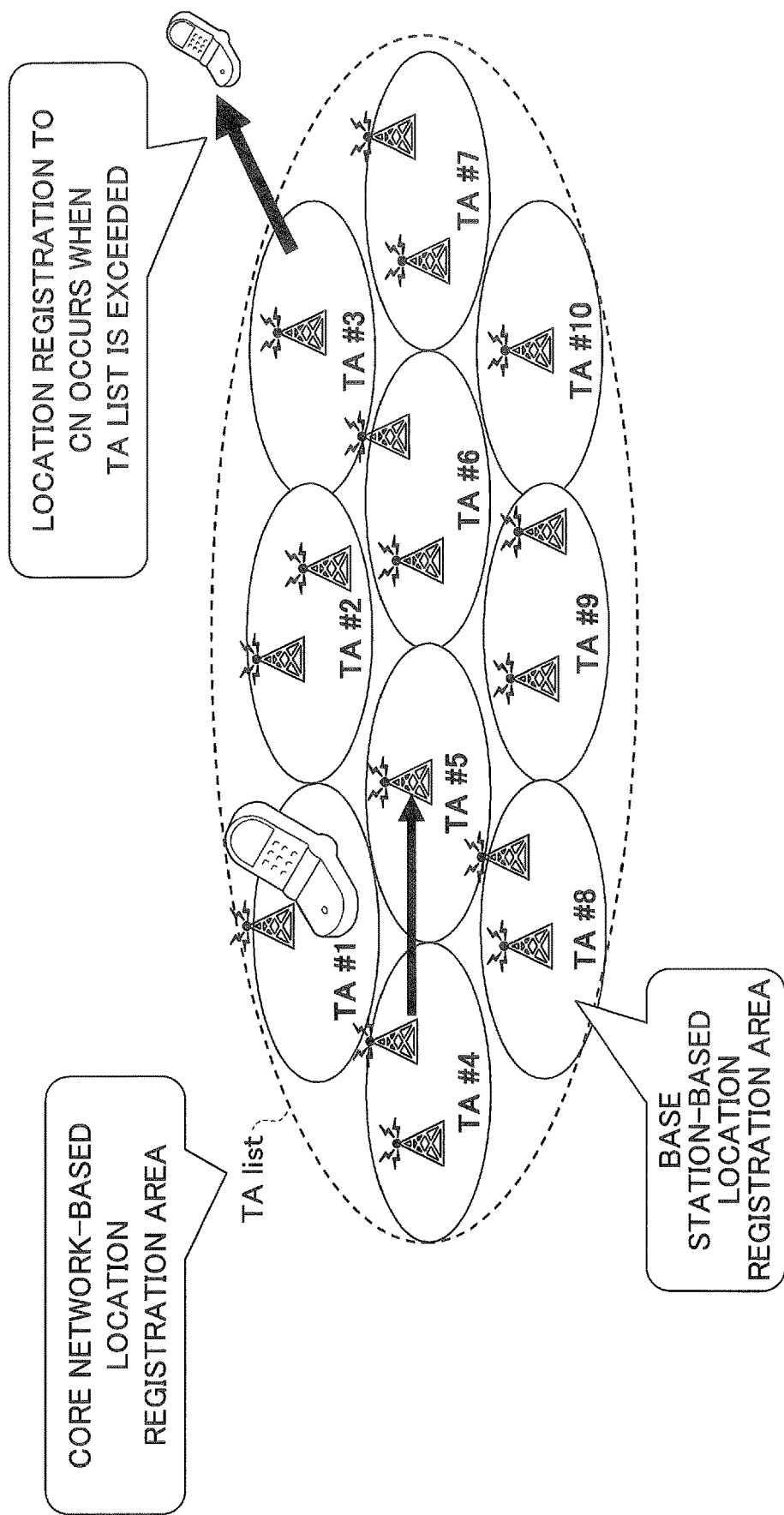
FIG. 15 is a schematic diagram illustrating a base station-based location registration area and a core network-based location registration area according to one embodiment of the present invention.

Specifically, as illustrated in FIG. 15, the base station-based location registration area may correspond to the tracking area (TA) in the LTE system and may be configured with one or more neighbor cells to which the same identifier (the tracking area identifier (TAI) or the tracking area code in the LTE system) is allocated. On the other hand, the core network-based location registration area may correspond to a tracking area group (paging area) included in a tracking area (TA) list in the LTE system. The location of the user equipment 100 is managed in accordance with the base station-based location registration area and the core network-based location registration area. In other words, similarly to the LTE system, in the NR system, a base station-based location registration area code indicating the base station-based location registration area to which the cell belongs is broadcast in each cell, and the user equipment 100 retains the received the base station-based save the registration area code. For example, for example, when power is turned on during movement, if it is detected that the acquired the base station-based location registration area code and the held the base station-based location registration area code are different from each other, the state management unit 110 determines that the base station-based location registration area has been changed.

Next, a base station-based location registration area update process according to one embodiment of the present invention will be described with reference to FIGS. 16 to 17. When it is detected that the acquired the base station-based location registration area code and the held the base station-based location registration area code are different, the user equipment 100 in the sustained state may determine that the base station-based location registration area has been changed and perform the base station-based location registration area update process.

Figure 16:
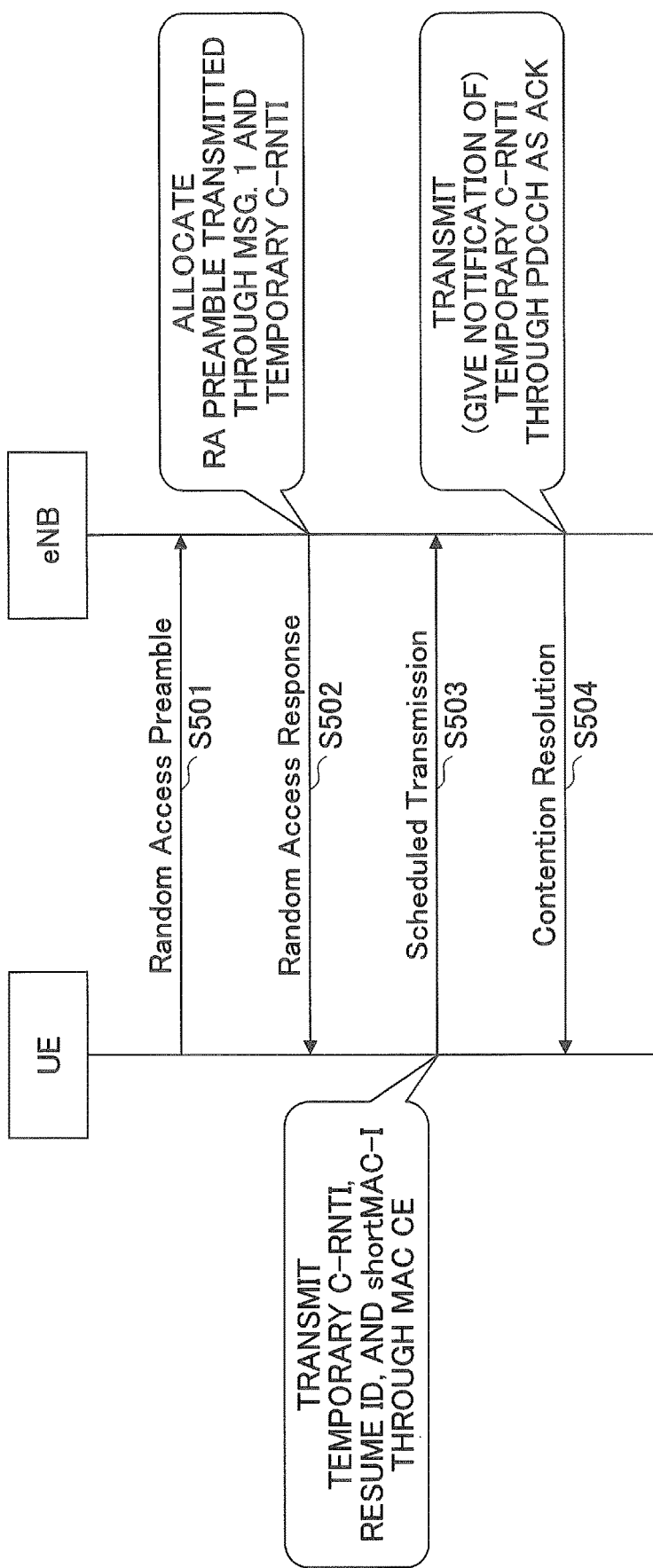
FIG. 16 is a sequence diagram illustrating a base station-based location registration area update process according to one embodiment of the present invention.

FIG. 16 is a sequence diagram illustrating the base station-based location registration area update process according to one embodiment of the present invention. The base station-based location registration area update process employs a random access procedure using four messages. As illustrated in FIG. 16, when it is detected that the base station-based location registration area code received from the base station 200 through the system information or the like is different from the retained base station-based location registration area code, in step S501, the user equipment 100 transmits a Random Access Preamble to the base station 200 as a message 1 in order to be attached to the base station 200 of the detected base station-based location registration area.

In step S502, the base station 200 allocates a Temporary C-RNTI to the received message 1 and transmits a Random Access Response including the received Random Access Preamble and the allocated Temporary C-RNTI to the user equipment 100 as a message 2.

In step S503, the user equipment 100 configures scheduled transmission by a medium access control (MAC) control element (CE) and transmits the received Temporary C-RNTI, the retained Resume ID, and the short MAC-I to the base station 200 as a message 3.

In step S504, the base station 200 transmits a Contention Resolution including the Temporary C-RNTI to the user equipment 100 as a message 4 in the PDCCH as an acknowledgment with respect to the received message 3. Accordingly, the user equipment 100 can complete the location registration in the base station 200.

Alternatively, the base station-based location registration area update process may employ a random access procedure using two messages. FIG. 17 is a sequence diagram illustrating the base station-based location registration area update process according to one embodiment of the present invention.

Figure 17:
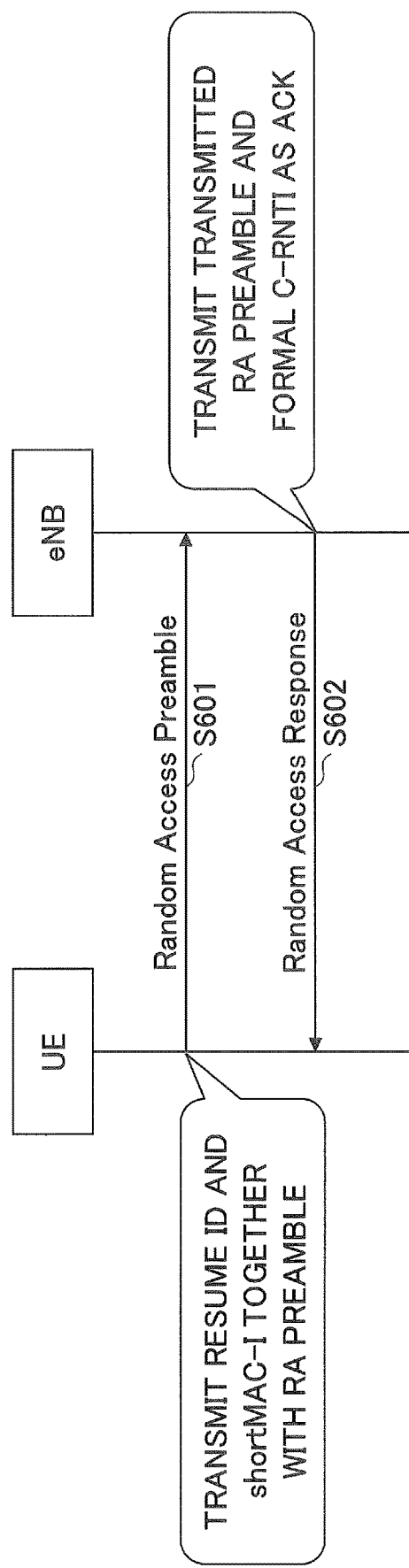
FIG. 17 is a sequence diagram illustrating a base station-based location registration area update process according to one embodiment of the present invention.

As illustrated in FIG. 17, when it is detected that the base station-based location registration area code received from the base station 200 through the system information or the like is different from the retained base station-based location registration area code, in step S601, the user equipment 100 transmits the Random Access Preamble including the retained Resume ID and the shortMAC-I for authenticating it to the base station 200 as a message 1.

In step S602, the base station 200 allocates a formal C-RNTI which is not temporary to the received message 1 as an acknowledgment with respect to the received message 1, and transmits the Random Access Response including the received Random Access Preamble and the allocated C-RNTI to the user equipment 100 as a message 2. Accordingly, the user equipment 100 can complete the location registration in the base station 200.

In the block diagrams used in the description of the above embodiment, the blocks of the functional units are illustrated. The functional blocks (configuring units) are implemented by an arbitrary combination of hardware and/or software. A device of implementing each functional block is not particularly limited. In other words, each functional block may be implemented by one device which is physically and/or logically combined or may be implemented by a plurality of devices, that is, two or more devices which are physically and/or logically separated and are directly and/or indirectly connected (for example, a wired and/or wireless manner).

Figure 18:
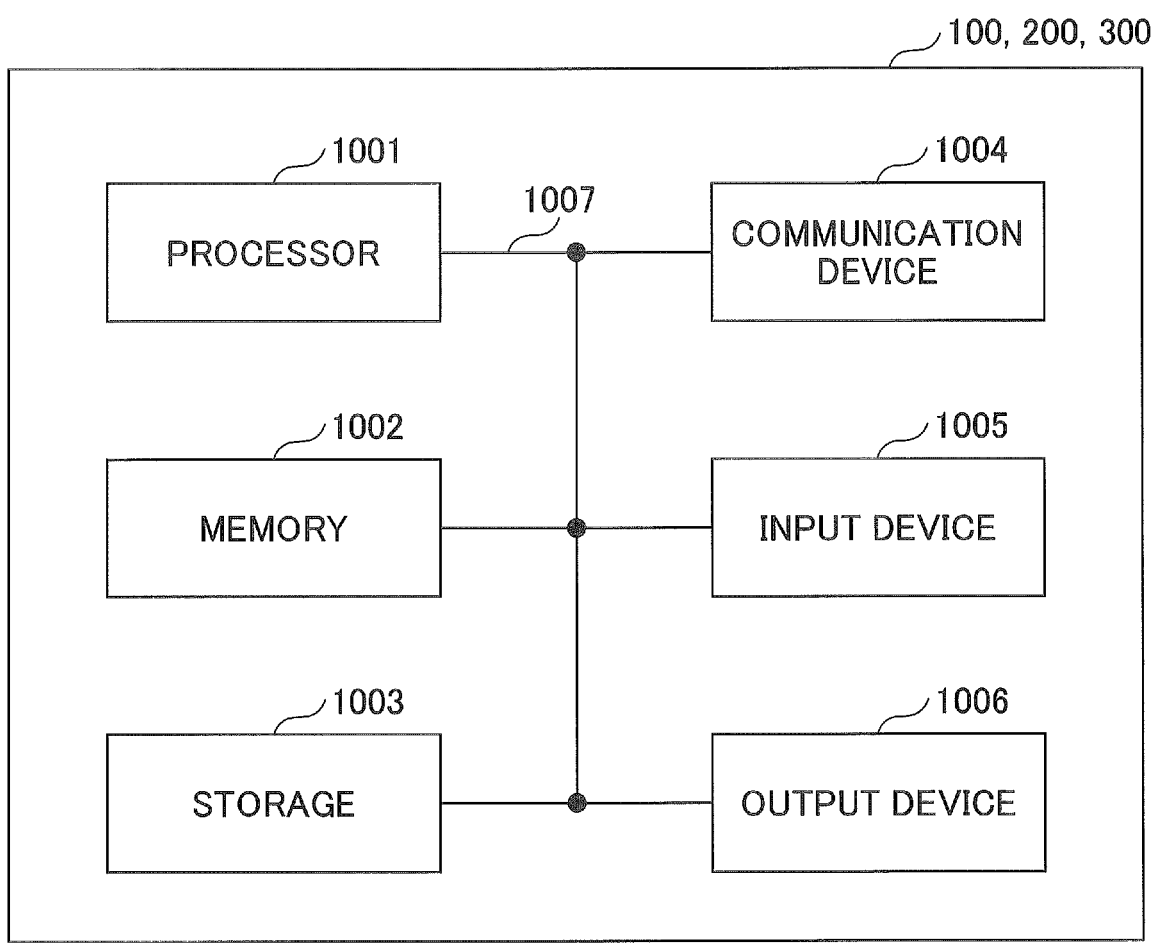
FIG. 18 is a block diagram illustrating a hardware configuration of each of a user equipment and a base station according to one embodiment of the present invention.

For example, each of the user equipment 100 and the base stations 200 and 300 in one embodiment of the present invention may function as a computer that performs the process of the radio communication method of the present invention. FIG. 18 is a block diagram illustrating a hardware configuration of each of the user equipment 100 and the base stations 200 and 300 according to one embodiment of the present invention. Each of the user equipment 100 and the base stations 200 and 300 described above may be physically configured as a computer device that includes a processor 1001, a memory 1002, a storage 1003, a communication device 1004, an input device 1005, an output device 1006, a bus 1007, and the like.

In the following description, the term "device" can be replaced with a circuit, a device, a unit, or the like. The hardware configuration of each of the user equipment 100 and the base stations 200 and 300 may be configured to include one or more devices illustrated in the drawing or may be configured without including some devices.

Each function in each of the user equipment 100 and the base stations 200 and 300 is implemented such that predetermined software (program) is read on hardware such as the processor 1001 and the memory 1002, and the processor 1001 performs an operation and controls communication by the communication device 1004 and reading and/or writing of data in the memory 1002 and the storage 1003.

For example, the processor 1001 operates an operating system and controls the entire computer. The processor 1001 may be configured with a central processing unit (CPU) including an interface with a peripheral device, a control device, an operation device, a register, and the like. For example, each component described above may be implemented by the processor 1001.

Further, the processor 1001 reads a program (a program code), a software module, and data from the storage 1003 and/or the communication device 1004 out to the memory 1002, and performs various kinds of processes according to them. A program causing a computer to execute at least some of the operations described in the above embodiment is used as the program. For example, the process performed by each component in each of the user equipment 100 and the base stations 200 and 300 may be implemented by a control program which is stored in the memory 1002 and operates on the processor 1001, or the other functional blocks may be similarly implemented. Various kinds of processes have been described as being performed by one processor 1001 but may be performed simultaneously or sequentially by two or more processors 1001. The processor 1001 may be implemented by one or more chips. The program may be transmitted from a network via an electric communication line.

The memory 1002 is a computer readable recording medium and configured with at least one of a read only memory (ROM), an erasable programmable ROM (EPROM), an electrically erasable programmable ROM (EEPROM), a random access memory (RAM), and the like. The memory 1002 is also referred to as a "register," a "cache," a "main memory," or the like. The memory 1002 can store programs (program codes), software modules, or the like which are executable for carrying out the radio communication method according to an embodiment of the present embodiment.

The storage 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage 1003 is also referred to as an "auxiliary storage device." The storage medium may be, for example, a database, a server, or any other appropriate medium including the memory 1002 and/or the storage 1003.

The communication device 1004 is hardware (a transceiving device) for performing communication between computers via a wired and/or wireless network and is also referred to as a "network device," a "network controller," a "network card," a "communication module," or the like.

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integratedly configured (for example, a touch panel).

The respective devices such as the processor 1001 and the memory 1002 are connected via the bus 1007 to communicate information with each other. The bus 1007 may be configured with a single bus or may be configured with different buses between the devices.

Further, each of the user equipment 100 and the base stations 200 and 300 may be configured to include hardware such as a microprocessor, a digital signal processor (DSP), an application specific integrated circuit (ASIC), a programmable logic device (PLD), or a field programmable gate array (FPGA) or all or some of the functional blocks may be implemented by hardware. For example, the processor 1001 may be implemented by at least one of these pieces of hardware.

A notification of information is not limited to the aspect or embodiment described in this specification and may be given by any other method. For example, the notification of information may be given physical layer signaling (for example, Downlink Control Information (DCI), uplink control information (UCI)), higher layer signaling (for example, radio resource control (RRC) signaling, medium access control (MAC) signaling, broadcast information (master information block (MIB), system information block (SIB))), other signals, or a combination thereof. Further, the RRC signaling may be referred to as an "RRC message" and may be, for example, an RRC connection setup message, an RRC connection reconfiguration message, or the like.

Each aspect and embodiment described in this specification is applicable to LTE, LTE-A, SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), and systems using any other appropriate systems and/or next generation systems expanded on the basis of the systems.

The processing procedures, the sequences, the flowcharts, and the like of the respective aspects/embodiments described in this specification may be reversed in order unless there is a contradiction. For example, the method described in this specification presents elements of various steps in an exemplary order and is not limited to a presented specific order.

In this specification, a specific action that is supposed to be performed by the base stations 200 and 300 may be performed by an upper node in some cases. In the network configured with one or more network nodes including the base station, various actions performed for communication with the terminal can be obviously performed by the base station and/or any network node (for example, an MME, an S-GW, or the like is considered, but it is not limited thereto) other than the base station. The example in which the number of network nodes excluding the base station is one has been described above, but a combination of a plurality of other network nodes (for example, an MME and an S-GW) may be provided.

Information and the like can be output from the higher layer (or the lower layer) to the lower layer (or the higher layer). Information and the like may be input/output via a plurality of network nodes.

Input and output information and the like may be stored in a specific place (for example, a memory) or may be managed through a management table. Input and output information and the like may be overwritten, updated, or additionally written. Output information and the like may be deleted. Input information and the like may be transmitted to another device.

The determination may be performed in accordance with a value (0 or 1) indicated by one bit, may be performed in accordance with a Boolean value (true or false), or may be performed by a comparison of numerical values (for example, a comparison with a value).

Each aspect/embodiment described in this specification may be used alone, may be used in combination, or may be switched in association with execution. Further, a notification of predetermined information (for example, a notification indicating "being X") is not limited to one which is performed explicitly and may be performed implicitly (for example, a notification of predetermined information is not given).

Although the present invention has been described above in detail, it is obvious to those having skill in the art that the present invention is not limited to the embodiments described in this specification. The present invention can be carried out as revisions and modifications without departing from the gist and scope of the present invention decided in claims set forth below. Therefore, the description of this specification is intended to be exemplary and does not have any restrictive meaning to the present invention.

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like regardless of whether software is called software, firmware, middleware, a microcode, a hardware description language, or any other name.

Further, software, commands, and the like may be transmitted and received via a transmission medium. For example, when software is transmitted from a web site, a server, or any other remote source using a wired technology such as a coaxial cable, a fiber optic cable, a twisted pair, or a digital subscriber line (DSL) and/or a wireless technology such as infrared rays, a radio wave, or a microwave, the wired technology and/or the wireless technology are included in a definition of a transmission medium.

Information, signals, and the like described in this specification may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or an arbitrary combination thereof.

The terms described in this specification and/or terms necessary for understanding this specification may be replaced with terms having the same or similar meanings. For example, a channel and/or a symbol may be a signal. Further, a signal may be a message. Further, a component carrier (CC) may be referred to as a "carrier frequency," a "cell," or the like.

The terms "system" and "network" used in this specification are used interchangeably.

Further, information, parameters, and the like described in this specification may be indicated by absolute values, may be indicated by relative values from predetermined values, or may be indicated by corresponding other information. For example, radio resources may be those indicated by an index.

The names used for the above-described parameters are not limited in any respect. Further, mathematical formulas or the like using the parameters may be different from those explicitly disclosed in this specification. Since various channels (for example, the PUCCH, the PDCCH, and the like) and information elements (for example, the TPC or the like) can be identified by suitable names, the various names allocated to the various channels and the information elements are not limited in any respect.

The base station can accommodate one or more (for example, three) cells (also referred to as "sectors"). When the base station accommodates a plurality of cells, the entire coverage area of the base station can be divided into a plurality of smaller areas, and each smaller area can provide communication service through a base station subsystem (for example, a small indoor base station remote radio head (RRH)). The term "cell" or "sector" refers to part or all of the coverage area of the base station and/or the base station subsystem that performs communication service in the coverage. Furthermore, the terms "base station," "eNB," "cell," and "sector" can be used interchangeably in this specification. The base station is also referred to as a fixed station, a Node B, eNodeB (eNB), an access point, a Femto cell, a small cell, or the like.

The mobile station UE is also referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other appropriate terms.

The terms "determining" and "deciding" used in this specification may include a wide variety of actions. For example, "determining" and "deciding" may include, for example, events in which events such as calculating, computing, processing, deriving, investigating, looking up (for example, looking up in a table, a database, or another data structure), or ascertaining are regarded as "determining" or "deciding." Further, "determining" and "deciding" may include, for example, events in which events such as receiving (for example, receiving information), transmitting (for example, transmitting information), input, output, or accessing (for example, accessing data in a memory) are regarded as "determining" or "deciding." Further, "determining" and "deciding" may include, for example, events in which events such as resolving, selecting, choosing, establishing, or comparing are regarded as "determining" or "deciding." In other words, "determining" and "deciding" may include events in which a certain operation is regarded as "determining" or "deciding."

Terms "connected," "coupled," or variations thereof means any direct or indirect connection or coupling between two or more elements and may include the presence of one or more intermediate elements between two elements which are "connected" or "coupled." The coupling or the connection between the elements may be physical, logical, or a combination thereof. When used in this specification, two elements may be considered to be "connected" or "coupled" with each other using one or more electric wires, cables and/or a printed electrical connection or using electromagnetic energy such as electromagnetic energy having a wavelength in a radio frequency domain, a microwave region, or a light (both visible and invisible) region as non-limiting and non-exhaustive examples.

A reference signal may be abbreviated as RS and may be called a pilot, depending on a standard to be applied.

A phrase "on the basis of" used in this specification is not limited to "on the basis of only" unless otherwise stated. In other words, a phrase "on the basis of" means both "on the basis of only" and "on the basis of at least."

Any reference to an element using a designation such as "first," "second," or the like used in this specification does not generally restrict quantities or an order of those elements. Such designations can be used in this specification as a convenient method of distinguishing between two or more elements. Thus, reference to the first and second elements does not mean that only two elements can be adopted there, or first element must precede the second element in a certain form.

Further, "means" in the configuration of each of the above devices may be replaced with "unit", "circuit", "device", or the like.

"Including," "comprising," and variations thereof are intended to be comprehensive, similarly to a term "equipped with" as long as the terms are used in this specification or claims set forth below. Furthermore, the term "or" used in this specification or claims set forth below is intended not to be an exclusive disjunction.

A radio frame may be configured with one or more frames in the time domain. Each of one or more frames in the time domain is also referred to as a subframe. Further, the subframe may be configured with one or more slots in the time domain. Further, the slot may be configured with one or more symbols (OFDM symbols, SC-FDMA symbols, or the like) in the time domain. Each of the radio frame, the subframe, the slot, and the symbol indicate a time unit when signals are transmitted. The radio frame, the subframe, the slot, and the symbol may have different corresponding names. For example, in an LTE system, the base station performs scheduling to allocate radio resources (a frequency bandwidth, transmission power or the like usable in each mobile station) to each mobile station. A minimum time unit of scheduling may be referred to as a transmission time interval (TTI). For example, one subframe may be referred to as a TTI, a plurality of consecutive subframes may be referred to as a TTI, or one slot may be referred to as a TTI. The resource block (RB) is a resource allocation unit in the time domain and the frequency domain and may include one or more consecutive subcarriers in the frequency domain. In the time domain of the resource block, one or more symbols may be included, and one slot, one subframe, or one TTI may be used. Each of one TTI and one subframe may be configured with one or more resource blocks. The structure of the radio frame described above is merely an example, and the number of subframes included in the radio frame, the number of slots included in the subframe, the number of symbols and resource blocks included in the slot, and the number of subcarriers included in the resource block can be changed variously.

The embodiments of the present invention have been described above in detail, but the present invention is not limited to the specific embodiments described above, and various changes and modifications can be made within the scope of the gist of the present invention set forth in claims.

The present application is based on and claims priority to Japanese patent application No. 2016-158271 filed on Aug. 10, 2016, Japanese patent application No. 2016-158272 filed on Aug. 10, 2016, and Japanese patent application No. 2016-215701 filed on Nov. 2, 2016, the entire contents of which are hereby incorporated herein by reference.

EXPLANATIONS OF LETTERS OR NUMERALS

10 radio communication system
100 user equipment
110 state management unit
120 state transition unit
200, 300 base station

The invention claimed is:
1. A terminal, comprising:
a receiver that receives Radio Resource Control (RRC) messages from one or more base stations;
a processor that:
when an RRC message for causing to transition from a connected state to a sustained state is received from a first base station that conforms to a first radio access technology, causes the terminal to transition from the connected state to the sustained state; and
retains a context identifier specifying a user equipment context for radio communication with the first base station and a base station-based location registration area configured with one or more cells including a cell of the first base station, the user equipment context being included in the RRC message,
wherein when the terminal is communicating with the first base station in the sustained state, if cell reselection for a second base station that conforms to a second radio access technology is performed, the processor causes the terminal to transition from the sustained state to an idle state in the second base station, and
wherein the processor drops the user equipment context and the context identifier at a predetermined timing.

2. The terminal according to claim 1,
wherein the RRC message further comprises timer information indicating a validity period of the user equipment context and the base station-based location registration area.

3. The terminal according to claim 1,
wherein the processor causes the terminal to transition from the sustained state to an idle state in the case where a message, which is received by the receiver from the first base station through a common channel when the terminal is communicating with the first base station in the sustained state, is determined to be destined for the terminal on the basis of the retained context identifier.

4. The terminal according to claim 2,
wherein the processor causes the terminal to transition from the sustained state to an idle state in the case where a message, which is received by the receiver from the first base station through a common channel when the terminal is communicating with the first base station in the sustained state, is determined to be destined for the terminal on the basis of the retained context identifier.

* * * * *